United States Patent
Widmer

(10) Patent No.: US 9,494,126 B2
(45) Date of Patent: Nov. 15, 2016

(54) DEVICE FOR OBTAINING ELECTRICAL ENERGY FROM WATER POWER

(75) Inventor: Felix Widmer, Winterthur (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 317 days.

(21) Appl. No.: 14/233,493

(22) PCT Filed: Apr. 27, 2012

(86) PCT No.: PCT/CH2012/000094
§ 371 (c)(1),
(2), (4) Date: Feb. 6, 2014

(87) PCT Pub. No.: WO2013/013328
PCT Pub. Date: Jan. 31, 2013

(65) Prior Publication Data
US 2014/0159372 A1    Jun. 12, 2014

(30) Foreign Application Priority Data
Jul. 22, 2011    (CH) .................................... 1233/11

(51) Int. Cl.
*F03B 7/00* (2006.01)
*F03B 13/00* (2006.01)

(52) U.S. Cl.
CPC ............... *F03B 13/00* (2013.01); *F03B 7/006* (2013.01); *Y02E 10/223* (2013.01)

(58) Field of Classification Search
CPC .......................................................... F03B 7/00
USPC ................................................. 415/5; 290/54
See application file for complete search history.

(56) References Cited

U.S. PATENT DOCUMENTS

| | | | |
|---|---|---|---|
| 119,580 A | 10/1871 | Daniels |
| 192,286 A | 6/1877 | Rose |
| 827,845 A | 8/1906 | Bloss |
| 855,164 A | 5/1907 | Couture |
| 920,361 A | 5/1909 | Merriam |

(Continued)

FOREIGN PATENT DOCUMENTS

| | | | |
|---|---|---|---|
| DE | EP 1731756 A2 * | 12/2006 | ............. F03B 7/006 |
| EP | 1795747 | 6/2007 | |

(Continued)

*Primary Examiner* — Joseph Waks
(74) *Attorney, Agent, or Firm* — Rankin, Hill & Clark LLP

(57) ABSTRACT

An installation for generating electrical energy from hydropower includes a drive arrangement that revolves around two deflection units distanced to one another and that can be driven in a revolving direction, with a load section running along a gradient. The drive arrangement includes a plurality of gravitational pressure transmission units that are arranged one after the other in the revolving direction, are distanced to one another and, in each case, include an onflow element. The installation also includes a generator for generating electrical energy from the revolving drive arrangement. The gravitational pressure transmission units include guide elements, and the installation includes at least one guide rail along the load section, in which guide rail guide elements of the gravitational pressure transmission units are displaceable so that the gravitational pressure transmission units, at least in the region of the load section, are guided between the two deflection units.

17 Claims, 15 Drawing Sheets

(56) References Cited

U.S. PATENT DOCUMENTS

| | | | |
|---|---|---|---|
| 973,869 A * | 10/1910 | Logan | F03B 13/264 |
| | | | 415/141 |
| 1,216,080 A | 2/1917 | Cooke | |
| 1,457,927 A | 4/1921 | Ebel | |
| 1,439,416 A | 6/1921 | Hess | |
| 1,483,505 A * | 2/1924 | Bradshaw | F03B 7/006 |
| | | | 415/116 |
| 1,567,971 A | 12/1925 | Marcel | |
| 2,758,814 A | 8/1956 | Kratz | |
| 3,945,755 A * | 3/1976 | Gentile | F03B 7/006 |
| | | | 415/5 |
| 4,112,686 A * | 9/1978 | Trotta | F03B 7/006 |
| | | | 415/5 |
| 9,347,423 B2 * | 5/2016 | Widmer | F03B 17/063 |
| 2010/0181773 A1 * | 7/2010 | Reist | F03B 17/066 |
| | | | 290/54 |
| 2015/0204299 A1 * | 7/2015 | Jones | F03B 7/006 |
| | | | 290/54 |

FOREIGN PATENT DOCUMENTS

| | | | |
|---|---|---|---|
| EP | 1980745 | | 10/2008 |
| FR | 2577997 A * | | 2/1985 |
| JP | 4848 | | 10/1901 |
| JP | 58-149578 U | | 10/1983 |
| JP | 09042140 A * | | 2/1997 |
| JP | 2000-352369 | | 12/2000 |
| JP | 2003042049 A * | | 2/2003 |
| JP | 2004-343413 | | 12/2004 |
| JP | 2005121002 A * | | 5/2005 |
| WO | 2011/041918 | | 4/2011 |

* cited by examiner

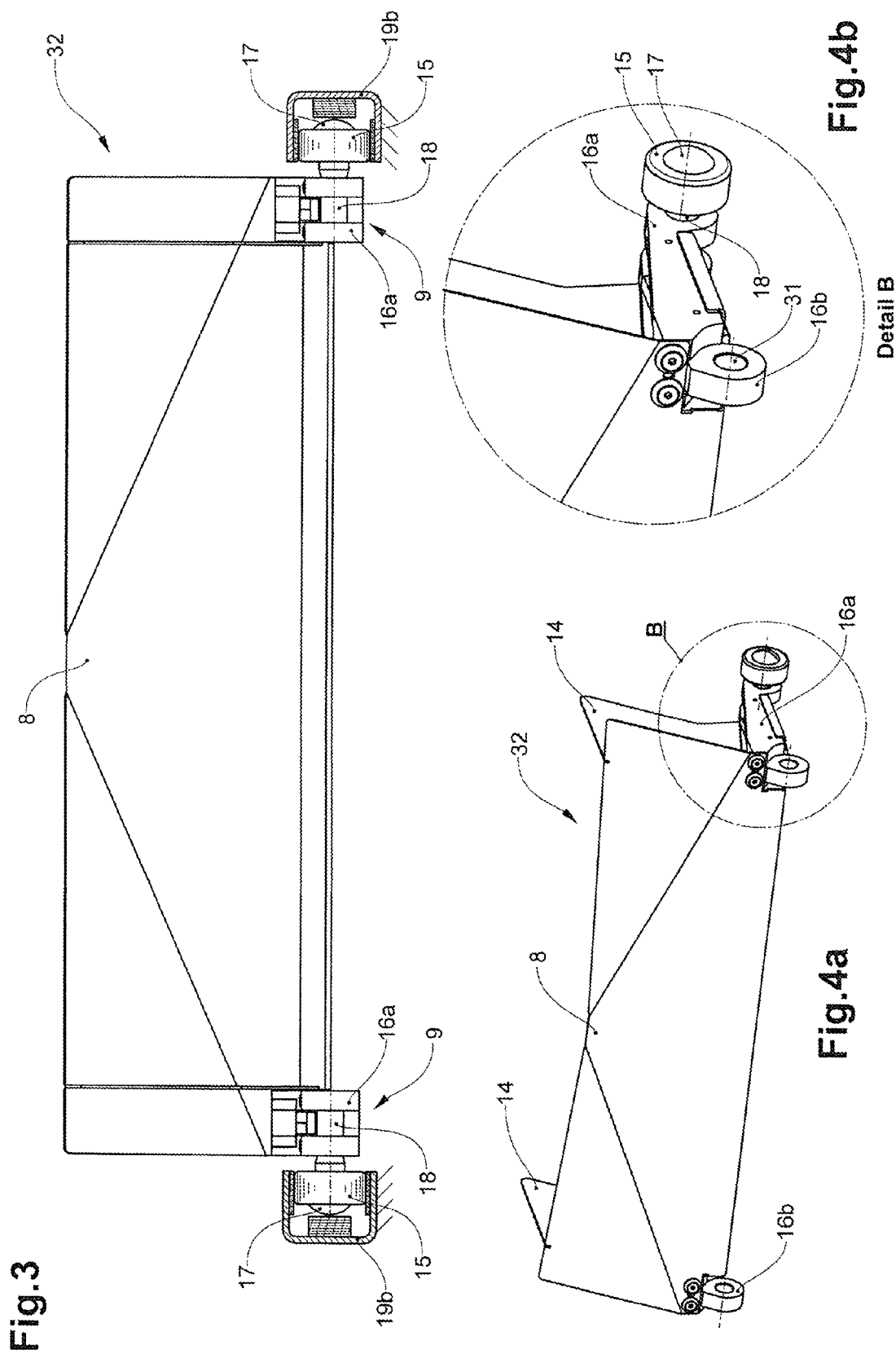

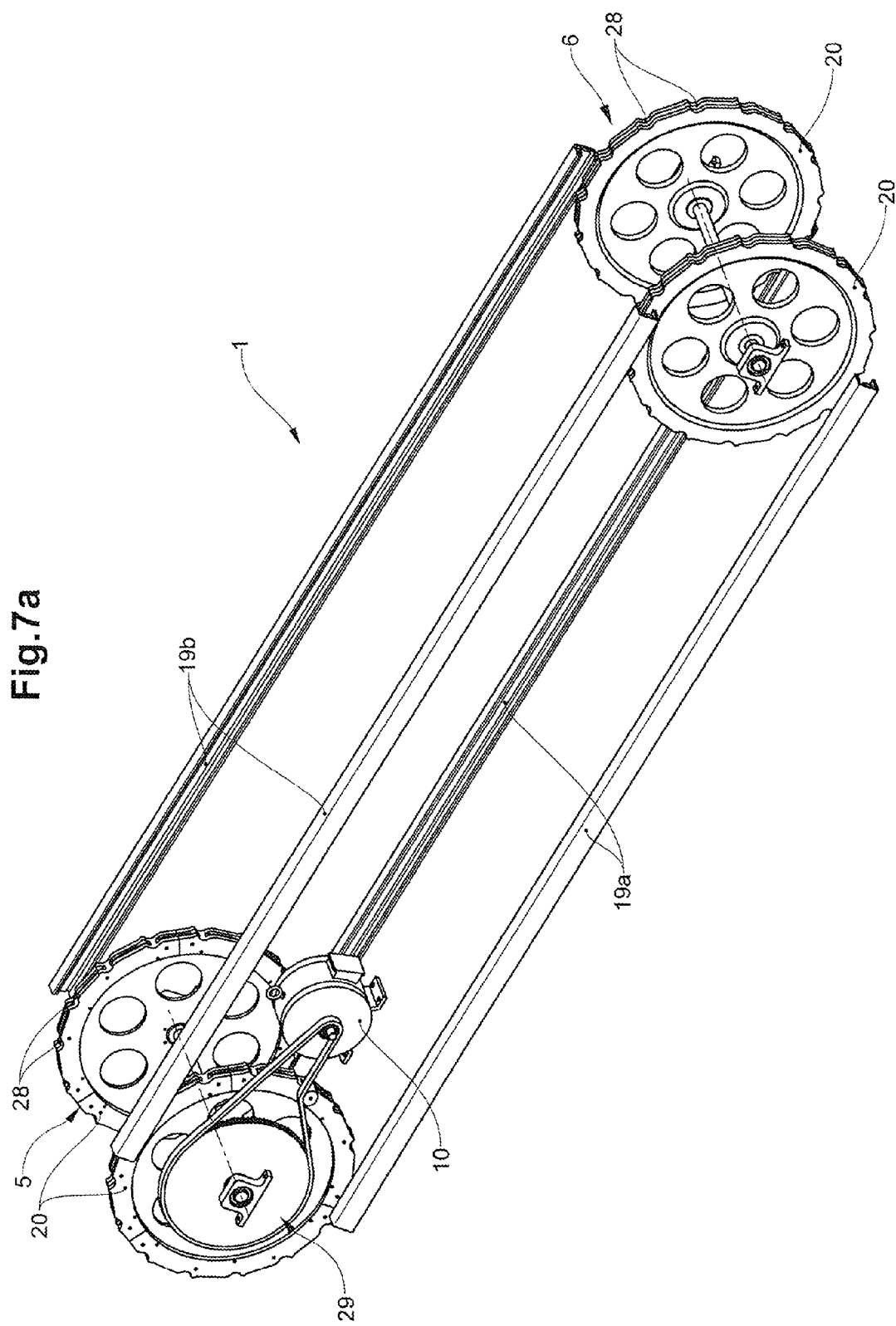

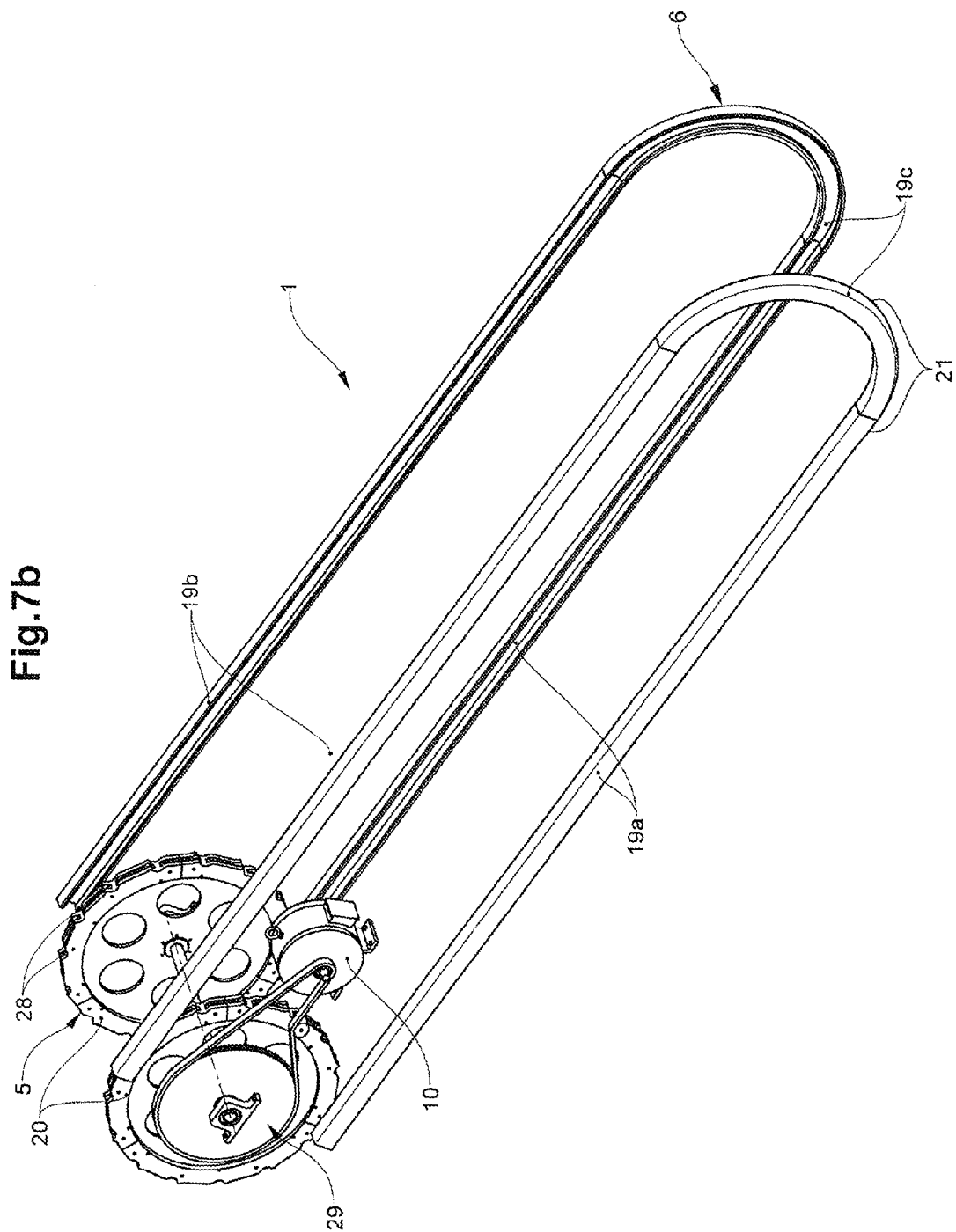

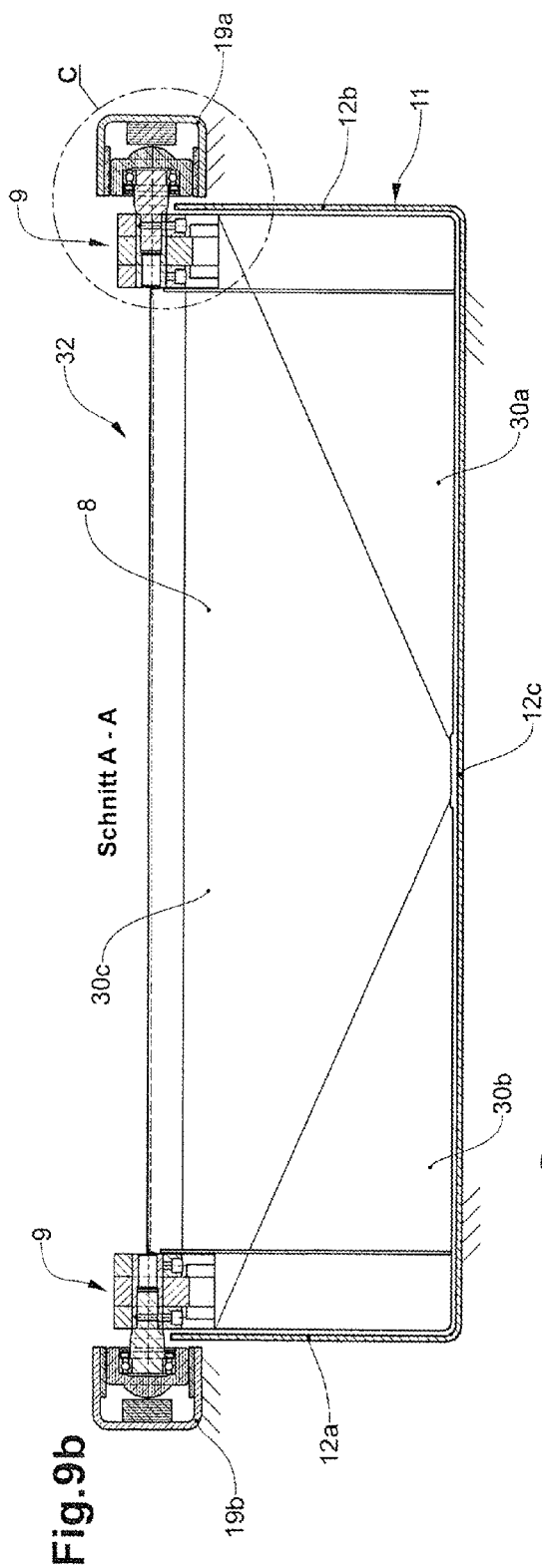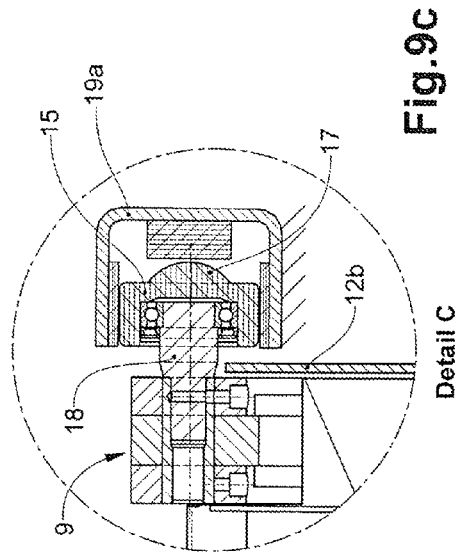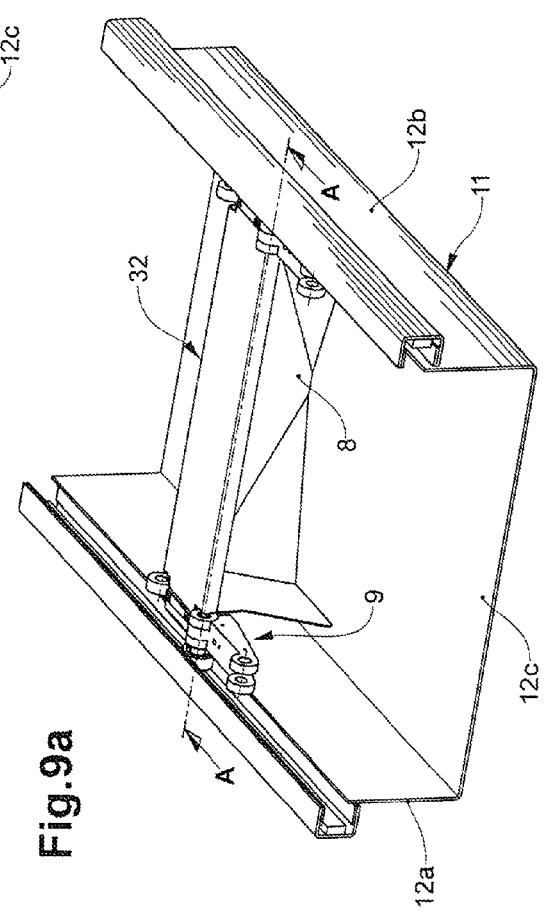

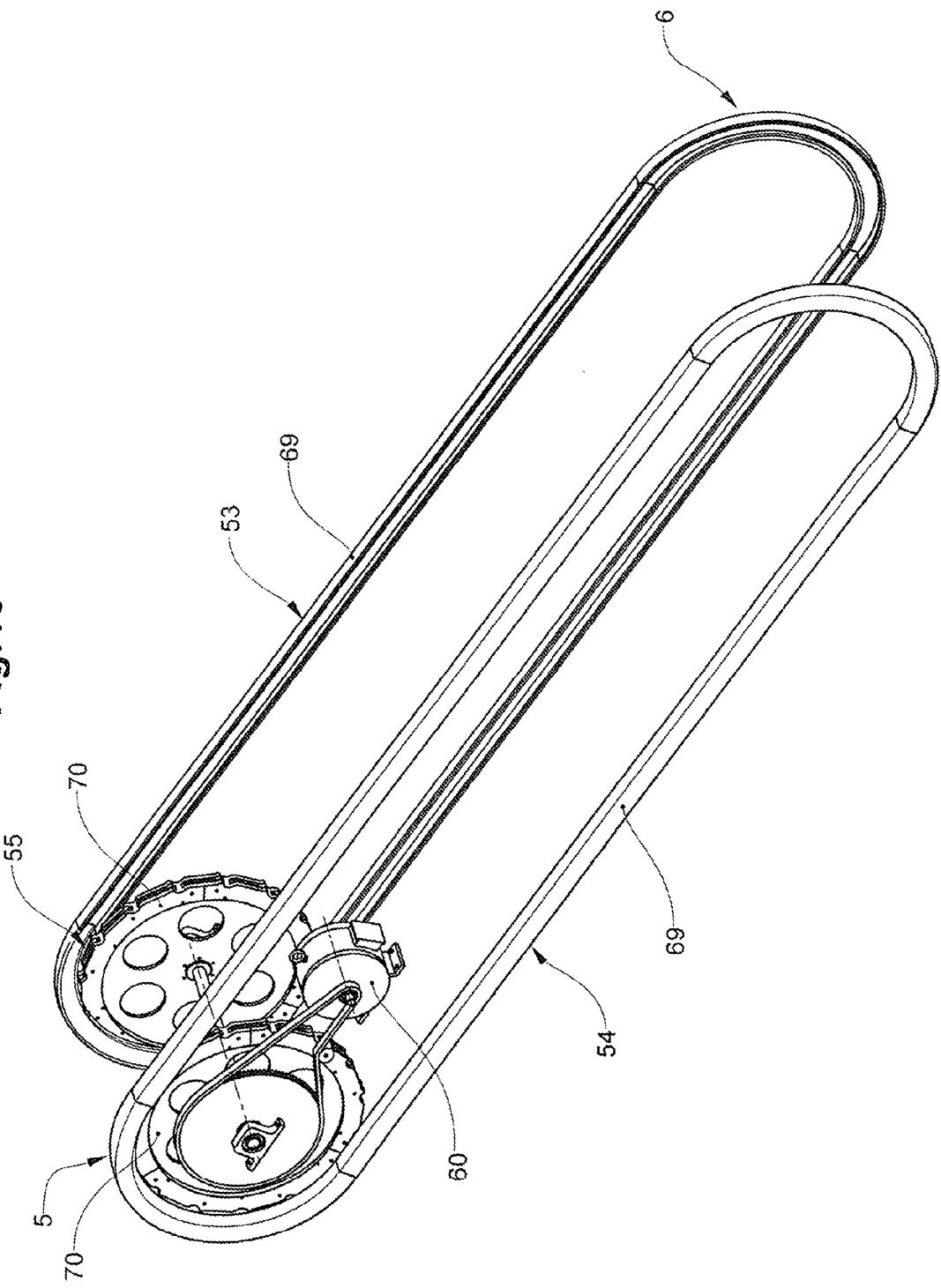

DEVICE FOR OBTAINING ELECTRICAL ENERGY FROM WATER POWER

BACKGROUND OF THE INVENTION

1. Field of the Invention

The invention relates to an installation for generating electrical energy from hydropower, comprising a drive arrangement which revolves around two deflection elements distanced to one another and which can be driven by hydropower in a revolving direction, with a load section running along a gradient. The drive arrangement comprises a plurality of gravitational pressure transmission units which are arranged one after the other in the revolving direction, are distanced to one another and are each with an onflow element, further comprising a generator for generating electrical energy from the revolving drive arrangement.

The invention moreover also relates to a method for operating such an installation.

2. Description of Related Art

A multitude of devices are known, which utilise the potential drop of water or its kinetic energy, in order to generate electrical energy therefrom. In this context, one basically differentiates between two installation types.

According to a first installation type, the kinetic energy of the onflowing water is utilised, in order to drive a generator for electricity production with this. For this, onflow elements such as turbine blades are provided, onto which water flows and which are set in motion by way of this. Hydropower installations of the first type are to be found in river power stations or storage power stations. The middleshot-undershot waterwheel is also driven in this manner.

According to a second installation type, it is not primarily the kinetic energy of the onflowing water, but rather its potential energy which is released whilst undergoing a potential drop which is utilised. This means that according to this principle, the gravitation force of the water acting on the onflow element drives an onflow element. This principle is utilised for example with an overshot waterwheel.

EP-A-1 731 756 for example describes a hydropower installation, with which the potential energy of water is utilised for generating electrical energy. The installation comprises a hydropower unit with a vertical shaft, and a generator connected to the hydropower unit. Blades which receive a certain volume of water are arranged in the shaft in a manner fastened on a chain. The chain and, via this, a generator are driven by the weight of the water bearing on the blades. The installation is however comparatively inflexible with regard to its application possibilities, since these can only be carried out in combination with a vertical shaft.

WO 2011/041918 likewise describes an installation for generating electrical energy from hydropower. This comprises a revolving drive chain with a load section and return section. The drive chain is led in a revolving direction around two deflection elements which are arranged horizontally as well as vertically offset to one another. The drive chain comprises a plurality of onflow elements which are arranged one after the other in the revolving direction and are distanced to one another. The onflow elements in each case form part of a chain link of the drive chain. The onflow elements on the side of the load section engage into an inclined water guidance channel and with the lateral channel walls as well as the channel base form water receiving compartments. The individual water receiving compartments in the run-in region accommodate a certain volume of water which is not let out of the water receiving compartment again until in the outlet region.

Moreover, the installation comprises a generator for generating electrical energy from the revolving drive chain. The water is fed into the water guidance channel at a run-in region which is situated at a higher level, wherein the blades immersing into the water guidance channel hold back the flowing-in water, in the formed water receiving compartments. The blades are driven by the force weight of the water, by which means the water is led in the receiving compartments along the water guidance channel to an outlet opening which is situated as a lower level. The described solution has the disadvantage that the guiding of the blades in the water guidance channel is quite imprecise, so that the receiving compartments in the movement direction are too permeable with regard to the entrained water, and a part of the entrained water runs down the water guidance channel to the outlet region, whilst not being utilised.

BRIEF SUMMARY OF THE INVENTION

It is therefore the object of the present invention, to improve the guiding of the onflow elements in the water guidance channel as well as the water guidance generally, in order not least to increase the efficiency of the installation.

The object is achieved by the features of the independent claim. Further preferred embodiments and further developments of the invention are to be deduced from the dependent patent claims. Thereby features of the method claims with regard to context can be combined with the device claims and vice versa.

The invention is thus characterised in that the gravitational pressure transmission units comprise guide elements, and the installation comprises guide means along the load section, in which guide means the gravitational pressure transmission units are displaceably arranged in a manner such that the gravitational pressure transmission units at least in the region of the load section are guidable between the two deflection elements.

The gravitational pressure transmission units are preferably positively guided (restraint-guided) via the guide elements guided in the guide means. "Positively guided" means that the guide elements are guided via the guide means at least in two spatial directions with respect to a three-dimensional orthogonal or polar coordinate system. These two spatial directions are preferably opposite to one another.

The gravitational pressure transmission units are preferably designed of several parts. Thus the guide elements and onflow elements are preferably designed as separate components.

The two deflection elements are preferably arranged offset to one another, horizontally as well as vertically.

The installation according to the invention moreover comprises a water guidance channel which runs along the descent or a slope, wherein the onflow elements of the gravitational pressure transmission units, in the region of the load section run transversely to the water guidance channel and engage into this.

In each case, two adjacent onflow elements, in the region of the load section, together with the channel walls form a water-receiving compartment which is co-moved along the water guidance channel. The onflow element which is subjected to onflow by water in the run-in region, thus serve as a compartment separation element.

The individual water receiving compartments in the run-in region accommodate a certain volume of water which is not released from the water receiving compartment again until in the outlet (discharge) region.

The water guidance channel, or also called trough, preferably forms a U-shaped cross-sectional profile with a channel base and two channel side walls. The onflow elements are usefully led in the water guidance channel in a contact-free manner.

Since the position of the onflow elements relative to the water guidance channel can be fixed in a very accurate manner thanks to the positive guiding by the guide means, the onflow elements only have very small distances to the adjacent channel walls. The gap distance can e.g. be merely 1 to 5 mm, in particular merely 2 to 3 mm.

An upper deflection element is preferably arranged in the run-in region, in which the water is admitted into the water guidance channel. A lower deflection element is preferably arranged in an outlet region, in which the water is released out of the water receiving compartments. The gravitational pressure transmission units are led back along the return section out of the outlet region into the run-in region. The return section preferably runs above the load section. The return section is preferably led parallel to the load section.

The water in the run-in region can flow in parallel to the revolving direction, thus frontally onto the onflow elements and into the water guidance channel. With certain configurations however, the water in the run-in region, seen in the revolving direction, preferably flows in laterally obliquely up to the onflow elements and into the water receiving compartments. A combination of a frontal and laterally oblique onflow is also possible.

The onflow elements are preferably designed as wall elements, in particular as blade-like wall elements. The onflow elements can e.g. comprise side walls which e.g. on both sides are curved oppositely to the movement direction of the drive arrangement and which form a blade-like receiver. The run-in procedure of the water is optimised by way of such a shaping.

The onflow elements are preferably designed in a lightweight construction manner. I.e., the wall elements are preferably designed in a thin-walled manner. The onflow elements are preferably manufactured of a lightweight construction material, such as aluminium or plastic, in particular fibre composite material. The onflow elements can also be designed of an aluminium-plastic-aluminium composite plate element.

The width (longitudinal extension transverse to the water guidance channel) of the onflow element is usefully significantly larger than its depth or height. Thus the ratio of the width to depth is preferably 2:1 or greater, and in particular 3:1 or greater or even 4:1 or greater.

It is also conceivable for the ratio of width to height to lie in a similar region. Thus this ratio e.g. can be 2:1 or greater and in particular 3:1 or greater or even 4:1 or greater.

Thanks to the specified length ratios, better filling results can be achieved for the water receiving compartments. This amongst other things is due to the fact that the width of the water feed in the run-in region is comparatively large in comparison to the depth of the forming water receiving compartments, which permits a rapid and accordingly high filling of the water receiving compartments. The width of the onflow elements can e.g. be about 1000 mm, whilst the depth is about 250 mm.

The wall-like onflow elements each preferably have at least one stiffening element, also called reinforcement element, so that they obtain an adequately high stiffness, in order to withstand the water pressure. Preferably, the onflow elements each comprise at least two stiffening elements which are arranged off-centred or laterally. The stiffening elements are preferably arranged in a lateral end region of the onflow elements. The stiffening elements can e.g. be designed as stiffening ribs or stiffening walls or transverse walls.

The stiffening walls can be closed or provided with openings. The stiffening walls in particular can be designed as an open lattice construction. The transverse walls preferably run parallel to the movement direction of the drive arrangement. The transverse walls can be attached onto the onflow element via a non-positive fit connection, a positive fit connection or material fit connection. A combination of the mentioned connection types is also possible. The transverse walls can in particular be stuck on, bonded or welded.

The guide means can be designed as guide rollers or sliding elements. The sliding elements can be sliding blocks.

The term "rollers" includes all bodies which are suitable for rolling over a surface. Wheels and balls for example are also included thereunder.

The positive guidance (restraint-guide) of the gravitational pressure transmission units can be designed in various manners with regard to the arrangement and design of the guide elements and the guide means.

Thus the guide means for example can comprise at least one guide rail which forms at least one running surface or sliding surface for the guide elements.

Moreover, the guide means can also be formed by a tubular channel, in which the gravitational pressure transmission units are displaceably guided. The tubular channel in the load section at the same time also forms the water guidance channel. The guide element here for example can be formed by the onflow element itself.

If the guide means comprise guide rails, then the gravitational pressure transmission units according to a first variant in each case comprise two guide elements which are arranged laterally of the onflow element seen in the revolving direction. The installation moreover in the load section comprises two guide rails which are each arranged laterally on the water guidance channel, in particular in the channel side walls, wherein the guide elements along the load section are led in the guide rails.

According to a first sub-variant, the guide elements, with respect to the closed revolving path, are arranged laterally on the radially outwardly lying end section of the onflow element. The guide rail is arranged laterally in the region of the end section of the water guidance channel which is towards the base.

According to a second sub-variant, the guide elements with respect to the closed revolving path are arranged laterally between the radially outwardy lying and inwardly lying end sections of the onflow element. The guide rails are arranged laterally in the region between the end section which is towards the base and the opening-side end section, of the water guidance channel, in or on the channel side wall.

According to a third sub-variant, the guide elements with respect to the closed revolving path are arranged laterally on the radially inwardly lying end section of the onflow element. The guide rails are arranged laterally in the region of the opening-side end section of the water guidance channel.

According a second variant, the installation comprises a guide rail arranged above the water guidance channel. The gravitational pressure transmission unit moreover comprises at least one guide element which is arranged above the onflow element and which in the region of the load section is led the guide rail.

The design of the drive arrangement can be likewise different with regard to the functional interaction between the individual gravitational pressure transmission units.

According to a first embodiment of the invention, the elements are then not connected to one another, i.e. are designed independently of one another with regard to connection technology.

The drive arrangement according to this embodiment is driven by the transmission of push forces between the gravitational pressure transmission units. The gravitational pressure transmission units are designed as push bodies and comprise force transmission elements for transmitting push forces from a gravitational pressure transmission unit trailing in the revolving direction, preferably directly, onto a gravitational pressure transmission unit running in front.

The force transmission elements can e.g. form pressure surfaces, via which the push forces between the gravitational pressure transmission units are transmitted further. In this manner, the drive arrangement can be moved around the deflection elements in the revolving direction similarly to a drive chain, without the gravitational pressure transmission units however being connected to one another.

According to a second embodiment of the invention, the drive arrangement is designed as a coherent (connected) drive structure, similarly to a drive chain, with a plurality of coherent drive links, similar to the chain links, wherein the drive links preferably correspond to the gravitational pressure transmission units. The gravitational pressure transmission units comprise connection means for the articulated connection of adjacent gravitational pressure transmission units, into a drive structure. Each drive link preferably comprises one onflow element.

The drive links of the drive structure can be driven in the revolving direction by way of transmission of tensile forces, push forces or a combination of pull and push forces.

Each drive link can comprise guide elements, in particular guide rollers, which are attached on this at both sides considered in the revolving direction, for the positive guiding of the drive structure at least in the region of the load section, along the water guidance channel.

Moreover, each drive link can comprise connection means which are attached on this at both sides seen in the revolving direction, for the articulated connection of adjacent drive links into a drive structure. The drive links in particular are pivotably connected to one another in a plane parallel to the movement direction or revolving path of the drive structure.

In a particularly preferred embodiment of the invention, the guide elements, in particular the guide rollers are arranged on the connection means and are connected to this via a connection pivot. The connection pivot is preferably simultaneously designed as a connection element between the drive links. The connection pivots thereby assume the function of a connection bolt. Of course, the connection between the drive links can also be designed independently of the connection of the guide elements.

According to a particular embodiment of connection means, the drive link in each case on each side comprises a fork-like receiver element with fork lugs which comprise openings for leading through a roller pivot corresponding to the connection pivot or axis. Furthermore, the drive link comprises a receiver body which lies opposite the fork-like receiver element in the movement direction, e.g. in the form of a lug, with an opening for leading through the roller pivot.

The receiver body now on both sides of the drive link is pushed between the fork lugs of the fork-like receiver element of the adjacent drive link, and the roller pivot of the guide roller is pushed through the openings in the fork lugs and the receiver body, for creating the connection between two drive links.

The guide elements, in particular the guide rollers, considered in the revolving direction, are preferably arranged in each case outside the lateral end of the onflow element. The guide elements further preferably each comprise a side guidance element which is directed laterally outwards towards the guide rail. The gravitational pressure transmission units, in particular the drive links, are movable via the side guidance elements on both sides transversely to the water guidance channel.

The side guidance element is preferably calotte-like or is designed as a guide cap, and is in guiding contact with the guide rail.

The guide rail is preferably designed as a profile longitudinal body for the guiding receiving of the guide elements. The profile longitudinal body in particular comprises a guide channel. The guide rail or the guide channel comprises a running surface for the guide elements, e.g. a sliding surface for sliding elements or a rolling surface for guide rollers, also called runner rollers.

The guide channel is preferably designed such that this forms a sliding surface or rolling surface at two sides lying opposite one another.

Moreover, the guide rail or the guide channel preferably also forms a guide surface for the side guidance elements, which lies transversely to the running surface.

The guide channel is preferably designed in a U-shaped or C-shaped manner and comprises e.g. two profile limbs and a connection wall. The guide channel is open towards the guide elements. According to a particular embodiment, the guide channel is open towards the water guidance channel.

One of the profile limbs e.g. forms the running surface of the guide elements. The connection wall between the two profile limbs e.g. forms the guide surface for the side guidance element. Since the gravitational pressure transmission unit comprises at least one guide element, preferably at both sides, accordingly in each case a guide rail is provided on both sides of the gravitational pressure transmission units. These preferably run parallel to one another.

According to a particular embodiment variant of the invention, the deflection elements are formed by arch sections of the guide rails which connect the guide rails to one another in the load section and the return section. In this manner, the gravitational pressure transmission units are also positively guided in the deflection region, by the guide rails. The arch pieces of the guide rails can also be part of the deflection element, which e.g. can also comprise a rotation body as described further below.

If U-guide profiles or C-guide profiles which are open towards the water guidance channel are used, these comprise guide surfaces for the guide elements, wherein these guide surfaces lie opposite one another. By way of this, the gravitational pressure transmission units or the onflow elements in the region of the load section are not pressed away upwards or lifted by way of the water pressure.

According to a preferred further development of the invention, one of the deflection elements, in particular the upper deflection element arranged in the run-in region comprises a rotation body, in particular a drive wheel, which is driven by way of the movement of the drive arrangement led around the rotation body over part of the periphery. The drive arrangement e.g. is engaged with a positive and/or friction fit with the rotation body in a part-peripheral manner, so that this rotation body is driven by the drive arrangement, e.g. at the speed of the drive arrangement.

If the deflection element is formed by the guide rail itself, then the above mentioned as well as subsequently described rotation body is assigned to the deflection element. The rotation body and guide rail according to definition can also together form the deflection element, since both devices participate in the deflection of the drive arrangement.

The drive wheel of the deflection element e.g. along its periphery comprises drive recesses, into which elements of the gravitational pressure transmission units engage and drive the drive wheel in this manner. These elements can be connection elements of drive links or roller pivots of guide rollers.

The mentioned deflection element is coupled for example to the electricity production generator. The generator can be coupled directly onto the rotation shaft of the rotation body. Moreover, the rotation movement can also be transmitted via a gear, from the rotation body onto the generator.

The electricity production generator coupled to the upper deflection element is thereby driven by the compressive force and/or tensile force of the gravitational pressure transmission units, in particular of the drive links.

The electricity production generator can also be part of a tow drive, with which the drive arrangement or the moved gravitational pressure transmission units in the load section drive a revolving, flexible force transmission element which in turn drives the electricity production generator.

According to a particular embodiment of the invention, that deflection element, to which no electricity production generator is assigned, or both deflection elements, comprise arcuately running guide rails which are arranged on both sides of the gravitational pressure transmission units and in which the gravitational pressure transmission units are positively guided via their guide elements and are deflected out of the load section into the return section or vice versa.

According to a particular embodiment of the invention, the gravitational pressure transmission units are positively guided via their guide elements in the guide rails along the complete revolving path. This means that the installation along the revolving path of the drive arrangement has a closed, positive guiding for the gravitational pressure transmission units. The closed positive guiding is particularly applied with drive arrangements, with which the gravitational pressure transmission units are not connected to one another, i.e. are not chain-linked to one another.

This embodiment has the further advantage that no chain of gravitational pressure transmission units connected to one another needs to be tensioned.

The lower deflection element which is assigned to the outlet region comprises guide rails preferably running in an arcuate manner. The arched course of the guide profiles preferably has a transition arch which runs from the load section or return section into the deflection element and which is design as a clothoid.

A body led along a clothoid arch is characterised by a uniform angle change, by which means e.g. transverse impacts which arise with a transition from a straight path section onto a circular arc are avoided in the deflection region. Moreover, generally transverse accelerations perpendicular to the movement path, and in particular acceleration peaks are reduced. The radius of curvature along the clothoid arch moreover continuously reduces, departing from the straight path section.

The load section and, as the case may be, also the return section preferably run in an oblique plane. This means that the onflow elements in these regions are moved linearly and with a constant inclination angle to a horizontal plane. However, it is also conceivable for the inclination angle to be variable in the region of the load section and/or return section. The water guidance channel and accordingly also the load section can also be integrated into several channel sections or load part-sections, which compared to the adjacent sections each case have a different inclination angle.

The water guidance channel runs between the upper and the lower deflection element, preferably parallel to the guide rail or guide rails. The water guidance channel therefore preferably likewise lies in an oblique plane. The inclination angle $\alpha$ of the oblique plane is greater than 0°. Moreover, the inclination angle $\alpha$ is smaller than 90° (angle degrees). Preferably, the inclination angle is larger than 10° and in particular larger than 20°. Moreover, the inclination angle is preferably smaller than 80° and in particular smaller than 70°. Particularly preferably, the inclination angle lies in a region of 30° to 60°.

The installation, in particular the drive arrangement and the deflection elements, are preferably assembled in a mount. The mount and the assembly of the operating components are preferably designed such that the inclination of the drive arrangement or of the load section as well as, as the case may be, also the length of the load section can be set and thus can be adapted to different channel descents and channel lengths.

The installation can further envisage a relief channel, which for example is led below the water guidance channel. The water stream led via a feed channel to the water guidance channel can be partly or completely diverted into the relief channel by way of this, whilst avoiding the run-in region. For this, a guidance element is provided, which can be activated and which controls the inflow into the relief channel or into the run-in region.

It is also possible for the drive arrangement together with the rail guidance assigned to this, and the defection elements, to be able to be lifted out of the water guidance channel by way of a lever mechanism via a control. The lifting of the mentioned elements can be provided for reasons with regard to safety technology, e.g. for protecting the installation given flooding, or for overhaul proposes.

The invention also relates to a method for the operation of the installation according to the invention. For this, water is admitted into the inclined water guidance channel of the installation at run-in region situated at a higher level. Onflow elements are guided by the upper deflection element in an arched, in particular circular movement path out of the return section into the run-in region and immerse into the water guidance channel.

During the immersion procedure, water flows from a feed channel into the water guidance channel and flows onto the immersing onflow element. The onflowing water is thus led into the water receiving compartments being formed at the same time. The water hereby is held in the water receiving compartments. I.e. the water cannot freely run down the water guidance channel.

The water held in the receiving compartments drives the onflow elements due to its drop in potential, thus due to gravity, along the water guidance channel in the direction of the lower deflection element or outlet region. The onflow elements at the lower deflection element via an arched or even part-circular movement path are pivoted out of the load section and accordingly out of the water guidance channel again, so that the entrained water is released in the outlet region out of the water receiving compartments and can be led away.

Of course, as the case may be, yet further deflection elements can be provided between the upper and the lower deflection element.

The functioning principle of this installation differs from the other installations in that the onflow elements and accordingly the drive arrangement is driven by the weight force of the water in the water receiving compartments, thus by their gravitational pressure.

The outlet region can be designed in a manner such that the water can exit downwards vertically or essentially vertically. For this, a type of shaft opening can be formed in the outlet region. By way of this, one prevents residual water being entrained by the onflow elements into the deflection at the lower deflection element, being led upwards and the efficiency of the installation being reduced on account of this.

The installation is operated in a power-variable manner, wherein the revolving speed can be adapted to the inflow speed of the water.

The installation is thereby controlled with a closed loop such that the drive arrangement moves with a constant speed given constant inflow quantities.

One can moreover envisage the inclination angle be changed e.g. according to power requirements.

The hydropower installation according to the invention can be applied wherever water must flow through a height difference. This can e.g. be flowing waters or outlets from dam installations. The application of the installation according to the invention is particularly suitable for already existing hydro-technical constructions or other industrial plants, since the government regulations for constructions in flowing waters can be quite strict.

Thus the installation is applied for example with sewage treatment installations, e.g. before the purified water is released into a water, or in industrial plants, in which larger quantities of process water are applied for processes. The installation according to the invention is already suitable for altitude drops of 2 to 20 m.

The positive guiding of the gravitational pressure transmission units in the load section permits an exact alignment of the onflow elements in the water guidance channel. For this reason, the onflow elements which are led in a preferably contact-free manner in the water guidance channel can be designed with comparatively low tolerances with respect to the water guidance channel.

BRIEF DESCRIPTION OF THE DRAWINGS

The invention is hereinafter explained in more detail by way of figures. The figures merely show a few particular embodiments and further developments, which in no way are to be seen as being conclusive. There are shown in:

FIG. 3 is an elevation view of a gravitational pressure transmission unit led in a guide rail;

FIG. 4a is a further perspective view of a gravitational pressure transmission unit, FIG. 4b is a perspective view of an enlarged detail of the connection means of a gravitational pressure transmission unit according to FIG. 4a;

FIG. 7a is a perspective view of the deflection elements with guide rails, according to a first embodiment, FIG. 7b is a perspective view of the deflection elements with guide profiles, according to a second embodiment;

FIG. 9a is a perspective view of an individual gravitational pressure transmission unit led in a water guidance channel;

FIG. 9b is a sectional elevation view of an individual gravitational pressure transmission unit led in a water guidance channel;

FIG. 9c is a detail elevation view of an individual gravitational pressure transmission unit led in a water guidance channel;

FIG. 10 is a perspective view of a further embodiment of an installation according to the invention, with a closed guide rail and with a drive unit;

DETAILED DESCRIPTION OF THE INVENTION

Figure 1:
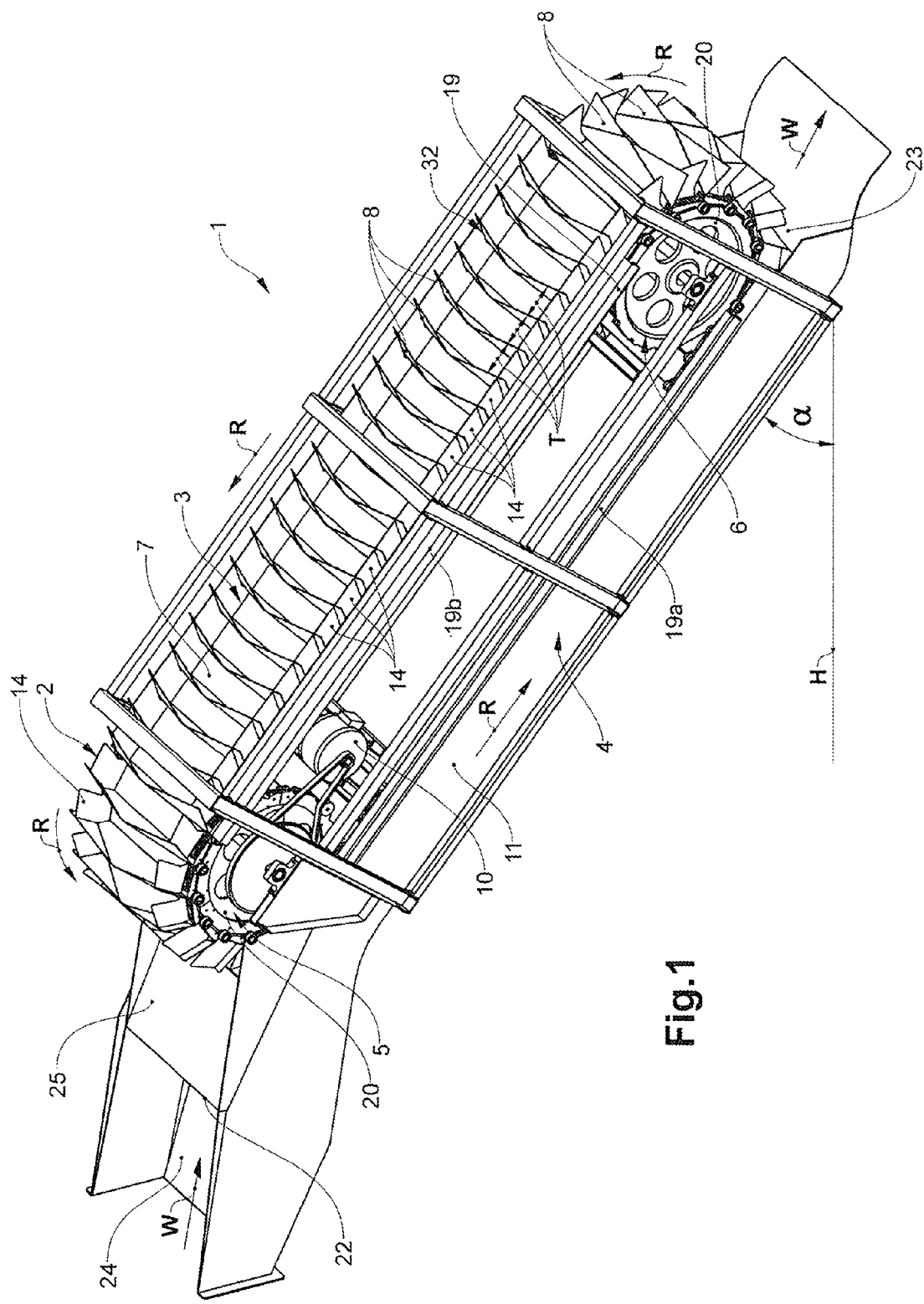
FIG. 1 is a perspective view of an installation according to the invention.

The installation 1 according to FIG. 1 shows a drive arrangement 2 in the form of a coherent drive structure 7, which is led along a revolving direction R around an upper deflection element 5 and a lower deflection element 6. The drive structure 7 comprises a load section 4, e.g. in the form of a load line, which is positively guided along a water guidance channel 11 (see also FIG. 9b), and a return section 3, e.g. in the form of a return line, which is led above and parallel to this load section.

Figure 2A:
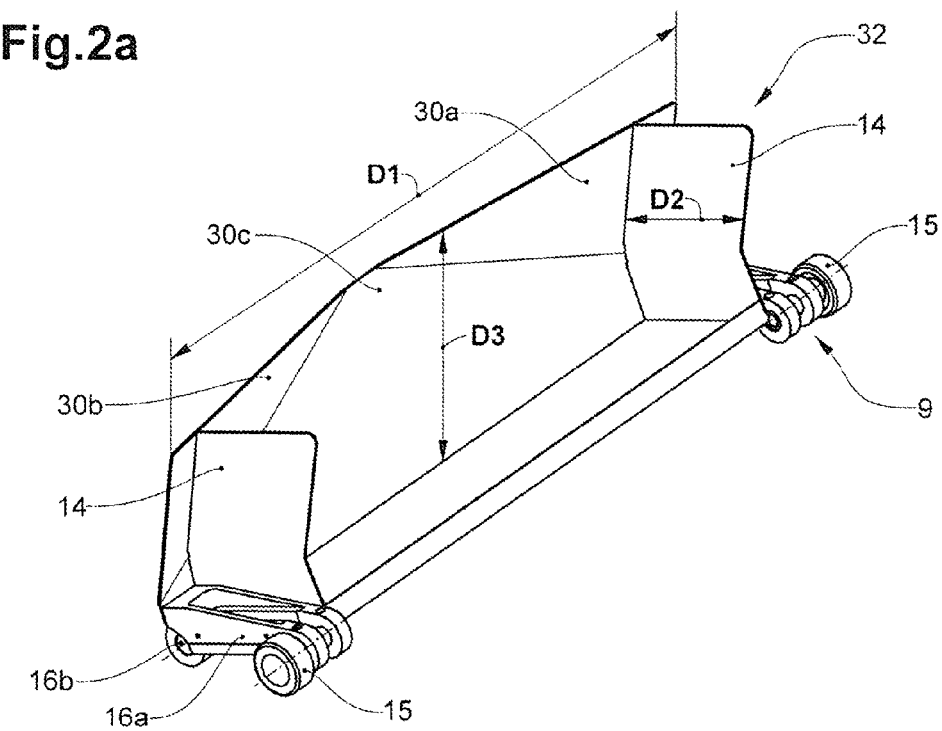
FIG. 2a is a perspective view of a gravitational pressure transmission unit.
Figure 2B:
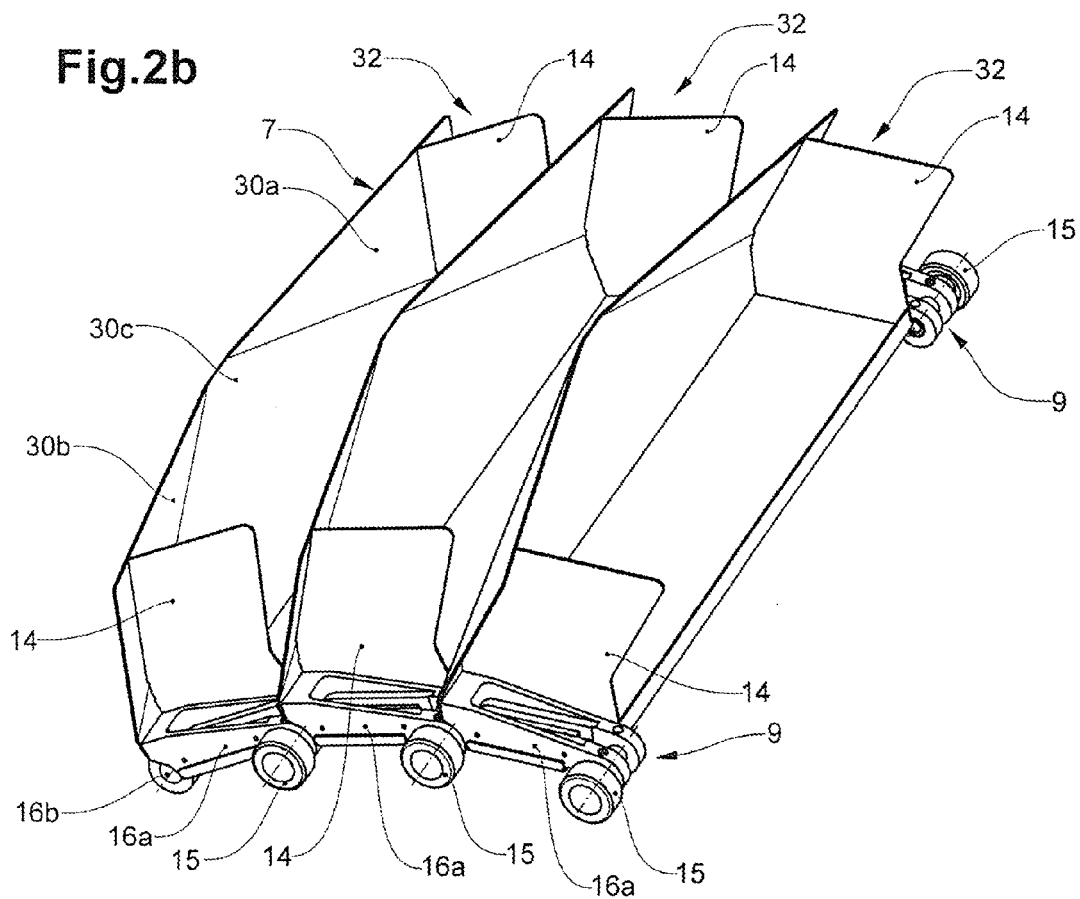
FIG. 2b is a perspective view of gravitational pressure transmission units.

The drive structure 7 is driven in the revolving direction R. The drive structure 7 is formed from a plurality of gravitational pressure transmission units 32 which are present as drive links 9 (see FIGS. 2a, 2b). The drive links 9 in each case comprise an onflow element 8 which along the load section 4 engages transversely into the water guidance channel 11.

The onflow elements 8 (see FIGS. 2a, 2b) are designed as blade-like wall elements and comprise two laterally arranged wall sections 30a, 30b which are curved or bent away out of the plane of the onflow element 8 in a manner opposite to the movement direction R of the drive structure 7. The bending angle can e.g. be 10-30°. The wall sections 30a, 30b delimit a flat, middle wall section 30c. The onflow element 8 has a width D1 which is smaller than the channel width by a gap tolerance. The onflow element further has a height D3 and a depth D2.

Two adjacent onflow elements 8 together with the channel base 12c as well as the two lateral channel walls 12a, 12b in each case form a so-called water receiving compartment 13, wherein the channel base 12c and the lateral channel walls 12a, 12b are preferably stationary. (see FIGS. 1, 5a, 5b, 6a, 6b and 9a-9c). The onflow elements 8 although being led in a contact-free manner to the water guidance channel 11, these however form a comparatively small gap to the channel walls 12a-12c thanks to the exact guiding of the drive links 9, and only very little water escapes from the water receiving compartments 13 through this gap.

The onflow element 8 further comprises two stiffening elements 14 in the form of transverse walls which are arranged laterally and off-centre. The transverse walls 14 however do not represent the lateral closure of the water receiving compartments 13, which as described above, are terminated laterally by the two lateral channel walls 12a, 12b.

Each drive link 9 further comprises two guide rollers 15 arranged laterally of the onflow element 8. The onflow element 8 moreover comprises a connection means in the form of a fork-like connection element 16a and of a connection body 16b lying opposite this in the movement direction R, and both of these are provided with suitable openings for receiving a roller pivot 18 of the guide rollers 15.

The drive links 9 on both sides are pushed with their respective connection bodies 16b into the opening between the fork lugs of the fork-like connection element 16a, for creating the coherent drive structure 7, wherein the roller pivot 18 is pushed through the openings in the fork lugs as well as in the receiver body 16b. Simultaneously, the guide roller 15 is also fastened via the roller pivot 18 on the drive link 9 or on the drive structure 7. Hereby, it is to be noted that the drive links 9 or the drive structure 7 requires no pivot elements which are continuous transverse to the movement direction R.

The water guidance channel 11 as well as the load section 4 lie in an oblique plane with a constant gradient and moreover run parallel to one another. In an upper run-in region 22 (see also FIGS. 5a, 5b, 6a, 6b), the water W is led out of a feed channel 24 to the water guidance channel 11. The water W released from the water receiving compartments 13 leaves the installation 1 in a lower outlet region 23.

The run-in region 22 comprises a passage limitation element 25. The size of the passage opening and thus the water quantify fed to the water guidance channel 11 can be controlled with the passage limitation element 25, via suitable control means. However, one can also envisage the passage opening being fixed beforehand and not being changeable during the operation of the installation 1.

The installation further comprises a relief channel 27 which runs below the water guidance channel 11 and preferably parallel to this, as is represented in the FIGS. 5a, 5b and 6a, 6b. The access to the relief channel 27 is controlled via a water guiding element 26 which can be an opening flap or an opening slide or a bulkhead.

The water stream W can be led into the water guidance channel 11 or into the relief channel 27 via the position of the water guiding element 26. The water guiding element 26 is likewise activated via a control device. The discharge of the water flow W via the relief channel 27 is effected for example if the installation must be taken out of operation, for overhaul and maintenance purposes for example.

Moreover, with the occurrence of much water, a part of the water can be discharged via the relief channel 27. The water guiding element 26 can also generally serve for the regulation of the water inflow into the run-in region, in order thus e.g. to ensure a constant revolving speed of the drive structure.

Moreover, the water or a part thereof can also be discharged via the relief channel 27 if foreign matter such as e.g. solid matter is contained in the water and which could compromise the functioning of the installation 1. As already mentioned, it is also possible for only a part of the water to be discharged via the relief channel 27.

Figure 5A:
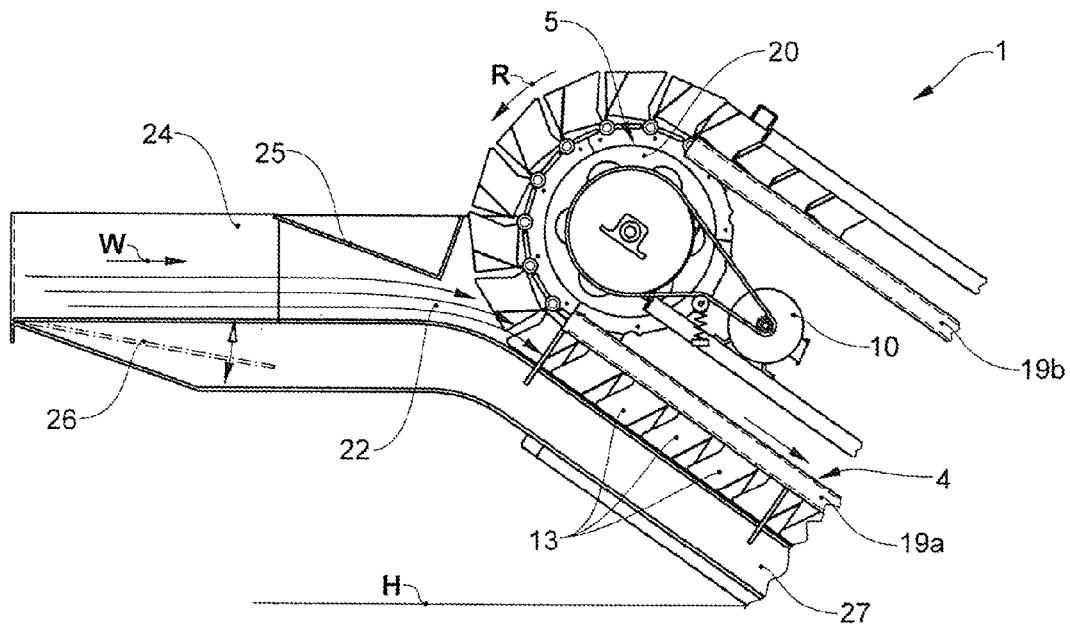
FIGS. 5a-5b are perspective views of an installation according to the invention, in the run-in region, according to a first embodiment.
Figure 5B:
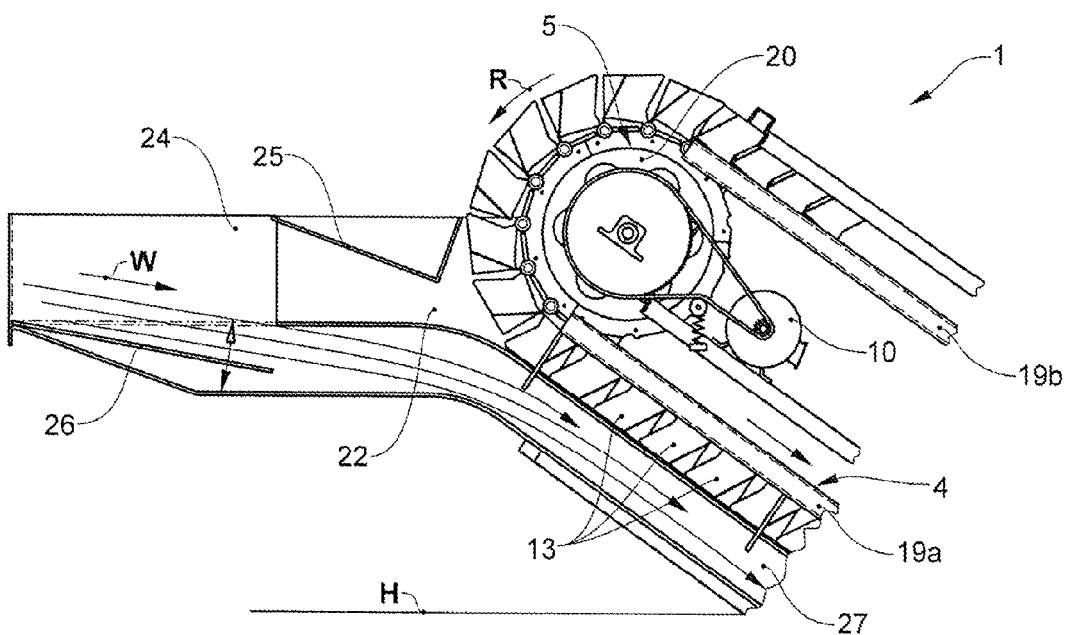
Figure 6A:
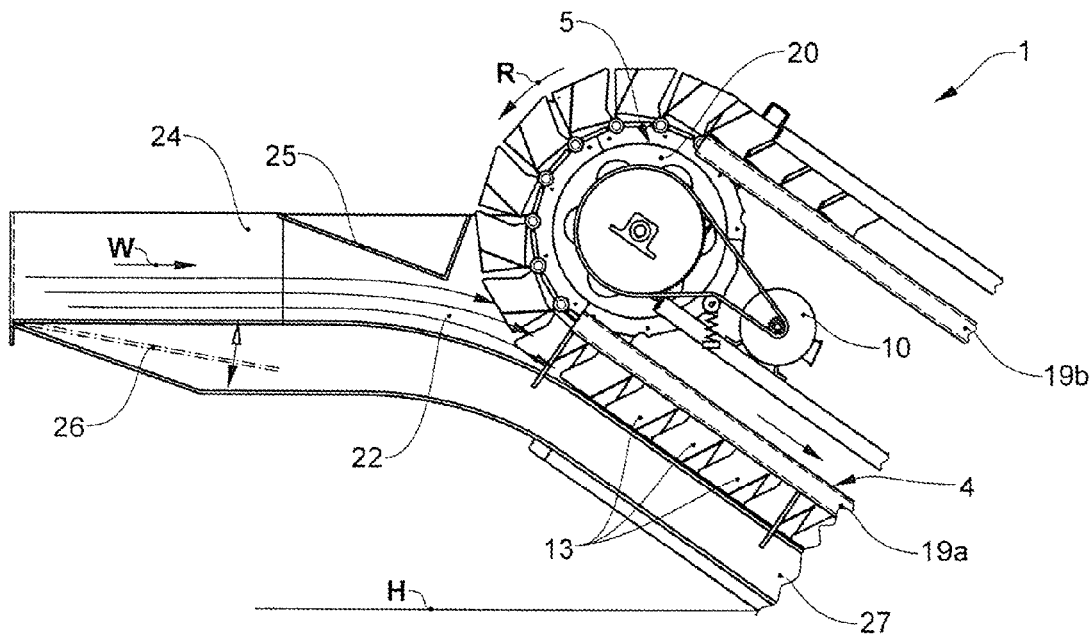
FIGS. 6a-6b are perspective views of an installation according to the invention, in the run-in region, according to a second embodiment.
Figure 6B:
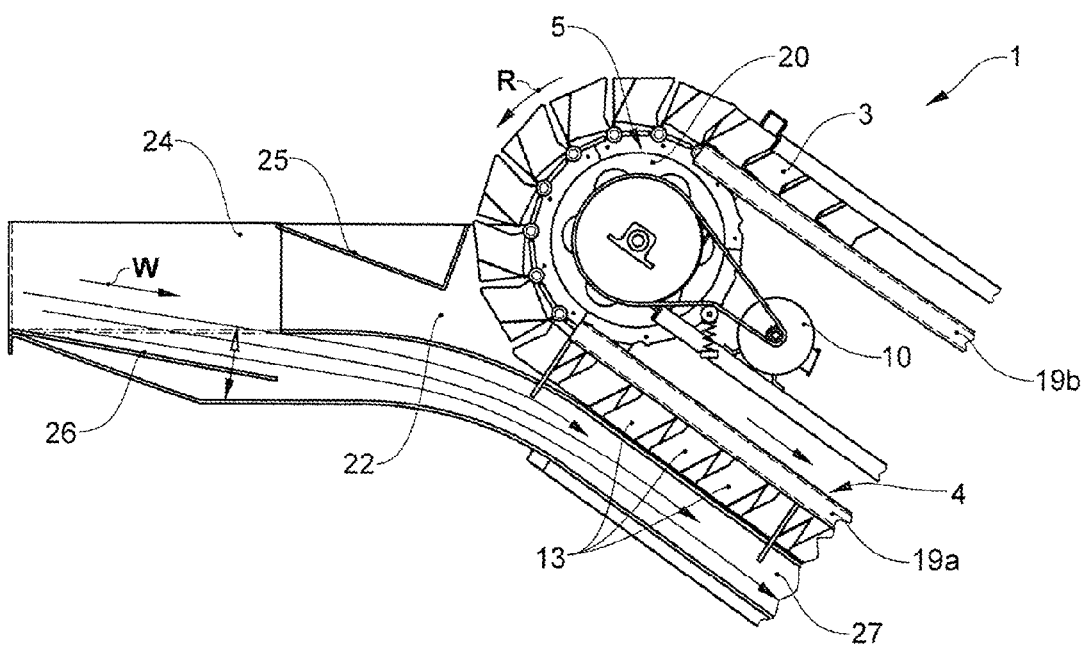

The water guiding element 26 according to the shown embodiment example is an opening flap in the base of the feed channel 24. In this manner e.g. heavy solid matter can be discharged out of the water stream W in targeted manner via the relief channel 27 whilst the installation is in operation. In the representations according to FIGS. 5a and 6a, the guiding element 26 is set such that the water stream is fed to the water guidance channel 11, whilst the guiding element 26 in the FIGS. 5b and 6b is set such that the water stream is fed to the relief channel 27.

The onflow elements 8 are led via the upper deflection element 5 into the run-in region 22, wherein these in the run-in region 22 are brought out of a curved path at the deflection element 5 into a linear movement path along the likewise linear water guidance channel 11 beginning in the run-in region 22.

The load section 4 thereby lies in the linear movement path of the onflow elements 8. Simultaneously, the water receiving compartments 13 are also formed in the run-in region 22. This is effected by way of guiding the onflow elements 8 together with the water guidance channel 11, i.e. by way of immersing the onflow elements 8 into the water guidance channel 11.

The water flow W in the feed channel 24 is fed horizontally or with a slight decent, to the run-in region 22, where this is then led into the greater descent of the water guidance channel 11. I.e., the inclined water guidance channel 11 connects to the feed channel 24, in the run-in region 22. The water guidance channel 11 as well as the load section 4 has an inclination angle $\alpha$ with respect to a horizontal H.

FIGS. 5 and 6 now differ in the guiding of the onflow elements 8 in the run-in region 22. According to the embodiment variant according to FIG. 5, the run-in region 22 and the guiding of the onflow elements 8 in the run-in region 22 are designed such that in each case only a single, forming water receiving compartment 13 is charged with water W in the run-in region 22. This means that the water filling of a water receiving compartment 13 being formed does not occur until the associated onflow element 8 running on front has immersed into the water guidance channel 11 up to its end position, and closes the water receiving compartment 13 running in front.

According to the embodiment variant according to FIG. 6, the run-in region 22 and the guiding of the onflow elements 8 in the run-in region 22 are designed such that in each case, two water receiving compartments 13 being formed are simultaneously charged with water W, in the run-in region 12. In this case, the filling of a water receiving compartment 13 being formed, with water, begins already before the associated, onflow wall 8 running in front is immersed into its end position into the water guidance channel 11, so that the water receiving compartment 13 running in front is not yet completely closed. I.e. the gap between the channel base 12c and the onflow element 8 still has not reached its minimal distance.

A particular embodiment of a lower deflection element 6 is represented in each case in the FIGS. 7a and 7b. According to the embodiment according to FIG. 7a, the upper as well as the lower deflection element 5, 6 comprise a rotation body 20 in the form of two laterally arranged drive wheels which are coupled via a rotation shaft and which have drive recesses 28 along their periphery. The drive wheel 20 with the peripheral recesses or prominences, such as e.g. teeth, executes the function of a cog.

The power for the generation of electrical energy is taken from the upper deflection element 5. The upper deflection element 5 for this is actively connected to an electricity production generator 10 which by way of a gear device 29 takes kinetic energy from the rotation movement of the drive structure 7 at the drive wheel 20 and converts it into electrical energy.

In each case, a lower and an upper pair of guide profiles 19*a*, 19*b* which run in parallel and which form the lateral guidance of the drive links 9 in the load section 4 lying at the bottom and in the return section 3 lying at the top, are arranged between the deflection elements 5, 6. The guide profiles 19*a*, 19*b* are designed as U-profiles for example, which in each case are open to the drive link 9. They are arranged laterally of the water guidance channel 11 above or in the region of the upper end section of the channel side walls 12*a*, 12*b* and are connected to a support device or directly or indirectly to the water guidance channel 11.

The guide rollers 15 of the drive links 9, as is shown in FIG. 3 or 9, engage on both sides laterally into the U-shaped guide profile 19*a*, 19*b* and roll along the runner surfaces on the guide profile 19*a*, 19*b*. The guide rollers 15 have a rolling surface of plastic such as POM (polyoxymethylene). Moreover, the running surface on the guide profile 19*a*, 19*b* also consists of plastic, such as e.g. POM. A low-noise and low-friction running behaviour of the guide rollers 15 is ensured in this manner.

The guide rollers are mounted in a low-friction manner via encapsulated bearings, e.g. ball bearings. The guide rollers 15 moreover comprise calotte-like side guidance elements 17 which are directed laterally outwards towards the guide profile 19*a*, 19*b* and via which the drive links 9 are axially guided in each case. The side guidance elements 17 as also the corresponding guide surface on the guide profile 19*a*, 19*b* are preferably of plastic, such as e.g. POM. The plastic is characterised by good sliding characteristics and its low water absorption capacity.

The guide rollers 15 of the drive links 9 which are led in the guide profiles 19*a*, 19*b* in each case when running into the lower or upper deflection element 5, 6 leave the associated guide profile 19*a*, 19*b*, wherein simultaneously the drive links 9 with their roller pivots 19 come to lie in the drive recesses 28. The rotation body 20 is driven by the drive structure 7 by way of this type of positive fit, wherein the drive structure 7 is simultaneously guided in an optimal manner. In the specific embodiment example, the free pivot section lying laterally outside the fork-like connection element 16*a* comes to lie in the drive recess 28.

The embodiment according to FIG. 7*b* now differs from the embodiment according to FIG. 7*a* described above, in that the lower deflection element 6 for the guided deflection of the drive structure 7 does not comprise a rotation body, but an arcuate guide profile 19*c* with an arched guide track. The arcuate guide profile 19*c* connects the lower guide profile 19*a* of the load section 4 to the upper guide profile 19*b* of the return section 3.

The drive links 9 of the drive structure 7 in this manner are led along the arched guide track from the load section 4 into the return section 3. The transition arch 91 from the load section 4 into the arcuate guide track of the lower deflection element 6 can be designed as a clothoid.

Of course, the deflection elements 5, 6 can comprise rotation bodies with recesses for receiving the roller pivots, as well as a curved guide profile with an arched guide track, so that the drive structure 7 is led via the guide rollers in the guide profile as well as via the rotation pivots in the recesses of the drive wheel (see FIG. 10).

Figure 8:
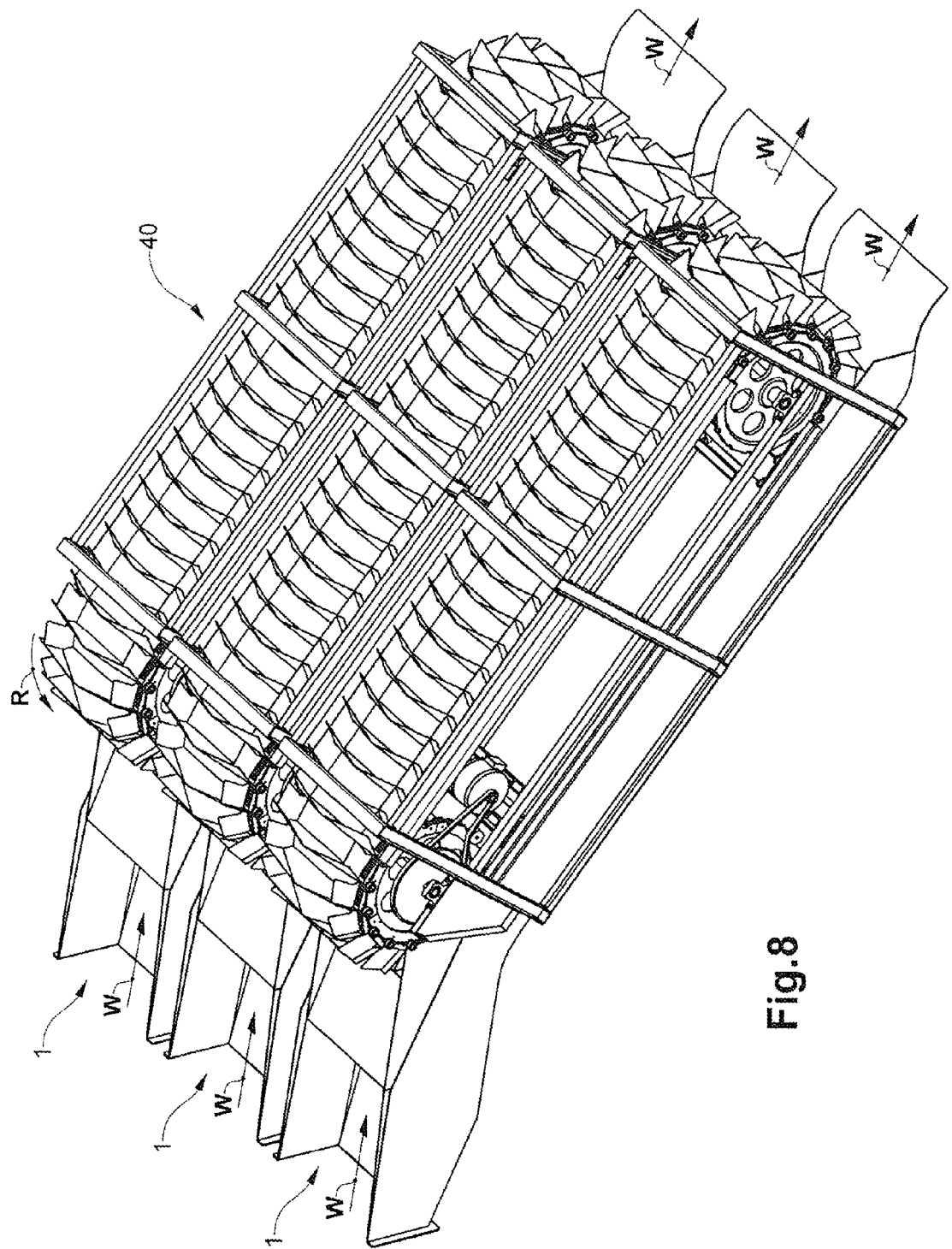
FIG. 8 is a perspective view of a hydropower station with several installations according to FIG. 1.

The installation according to the invention is in particular suitable for a modular construction of a hydropower installation. Thus for example several installations according to the invention and which are described above can be arranged next to one another as is shown in FIG. 8 by way of example and in this manner can be combined into a hydropower installation 40. Moreover, also several installations according to the invention alternatively or in combination with the previously mentioned parallel arrangement, can be arranged one after the other, i.e. in series.

Depending on the occurrence of water, for example individual installations 1 can be connected or disconnected. This is effected via the control of the water feed into the individual run-in regions.

The perspective part-view of a particular embodiment of an installation according to the invention and which is shown in FIG. 10 comprises two guide rails 69 which are distanced to one another, run parallel to one another and form a closed guidance along a revolving path. The guide rails 69 in each case have an inclined and level guide section, in a load section and return section 54, 53.

The guide rails 69 in an upper and a lower deflection region are designed as arched deflection elements 5, 6 which deflect the gravitational pressure transmission units out of the return section into the load section and vice versa. The mentioned arch pieces connect the straight guide sections of the guide rails in the load section and return section 54, 53 in each case into a closed guide track. A positive guidance results from this.

The guide rails for example comprise a U-shaped profile longitudinal body. The U-shaped profile longitudinal bodies of the guide rails 69 are open towards one another. The gravitational pressure transmission units (not shown) are now arranged between the two guide rails 69 and are guided via corresponding guide elements, in the guide rails 69.

In the upper deflection region, the guide rails 69 are guided with their arched sections around or along the periphery of a rotation body 55. The rotation body 55 comprises two drive wheels 70 which are distanced to one another and are connected to one another via a rotation shaft.

The drive wheels 70 comprise drive recesses which are arranged along their periphery and into which the gravitational pressure transmission units engage (not shown) and in this manner drive the rotation body 55.

The rotation body 55 is coupled to the electricity production generator 60 for the purpose of tapping power. The rotation body 55 and thus the electricity production generator 60 are driven by way of the push force and/or pull force of the gravitational pressure transmission units.

Figure 11:
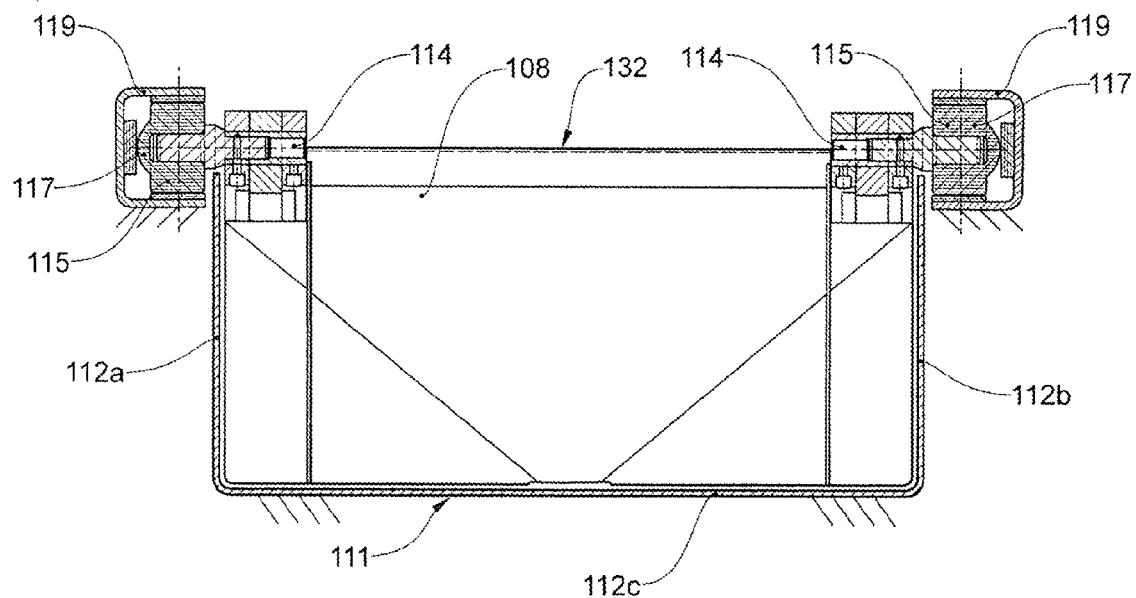
FIG. 11 is a sectional elevation view of a further embodiment of a gravitational pressure transmission unit.

One possible design solution of the positive guiding according to the third sub variant described further above is represented in FIG. 11. The embodiment according to FIG. 11 shows a rectangular water guidance channel 111 with a channel base 112*c* and two channel side walls 112*a*, 112*b*. Guide rails 119 are arranged laterally on the water guidance channel 11 at both sides, in the opening-side region of the channel side walls 112*a*, 112*b*.

The gravitational pressure transmission unit 132 with its onflow element 108 is arranged in the water guidance channel 111. The onflow element 108 is guided in the water guidance channel 111 in a contact-free manner, but however assumes practically the complete cross section of the water guidance channel 111 whilst forming small gap distances.

The gravitational pressure transmission unit 132 comprises two sliding elements 115 which with respect to the revolving direction are arranged on the radially inwardly lying end section of the onflow element 108 and laterally of this section.

The guide rails 119 each comprise a U-shaped longitudinal profile which is open towards the sliding elements 115 which are assigned to these guide rails. The longitudinal profiles are thus directed towards one another with their guide channel openings. The sliding elements 115 are led in the guide channel in a sliding manner.

The sliding elements 115 each comprise a calotte-like side guidance element 117 which is directed laterally outwards towards the guide rail 119 and via which the gravitational pressure transmission unit 132 is guided laterally in the guide rail 119.

The sliding elements 115 are fastened on the onflow element 108 via connection pivots 114 arranged transversely to the revolving direction.

Figure 12:
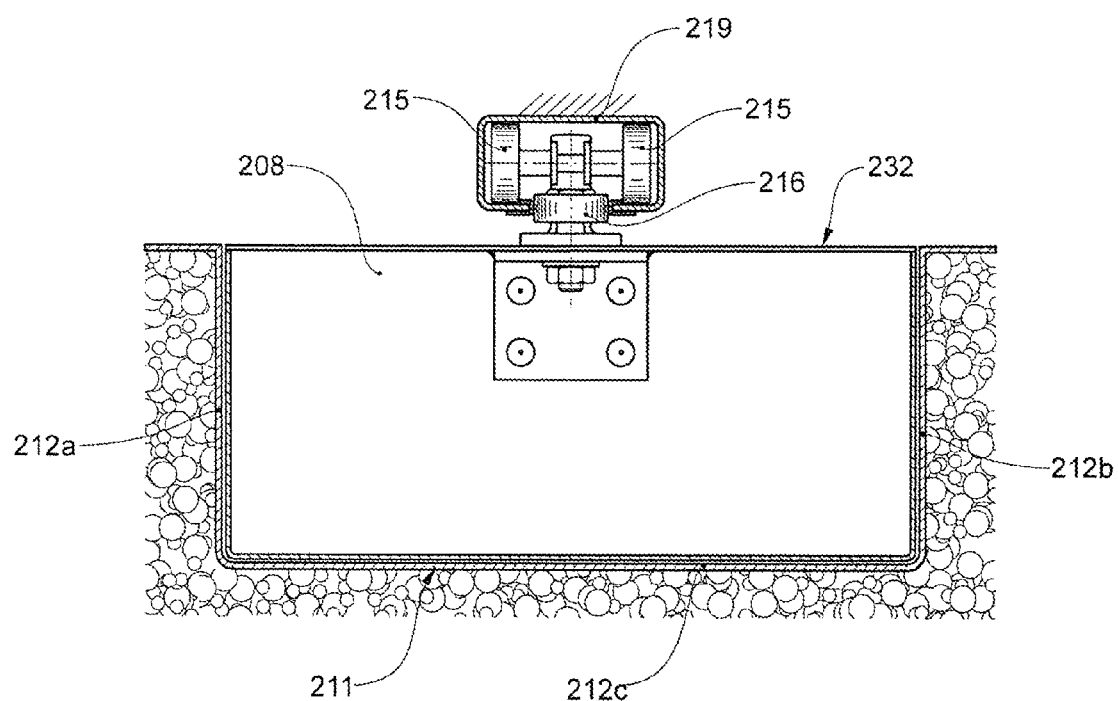
FIG. 12 is a sectional elevation view of a further embodiment of a gravitational pressure transmission unit.

One possible design solution of the positive guiding according to the second embodiment variant described further above is represented in FIG. 12. The installation according to FIG. 12 likewise shows a rectangular water guidance channel 211 with a channel base 212c and two channel side walls 212a, 212b.

A guide rail 219 is arranged above the water guidance channel 211. The guide rail 219 has a C-shaped longitudinal profile which is open towards the water guidance channel 21 and forms a gap-like guide channel opening.

The gravitational pressure transmission unit 232 with its onflow element 208 is arranged in the water guidance channel 211. The onflow element 208 is led in the water guidance channel 211 in a contact-free manner but assumes practically the complete cross section of the water guidance channel 211 amid the formation of small gap distances.

The gravitational pressure transmission unit 232 comprises two guide rollers 215 which are distanced to one another, connected to one another via a pivot, and via the onflow element 208 are arranged between the end sections of the onflow element 208 and here outside of the water guidance channel 211, said end sections being lateral considered in the revolving direction. The guide rollers 215 are guided in a rolling manner in the C-shaped guide channel of the guide rail 219.

The guide rollers 215 are connected to the onflow element 208 via a suspension led through the guide channel opening. The gravitational pressure transmission unit 232 furthermore in the region of the suspension comprises a horizontal guide element 216 which is led in the gap-like guide channel opening and thus laterally guides the onflow element 208. The horizontal guide element 216 can likewise be a roller.

Figure 13:
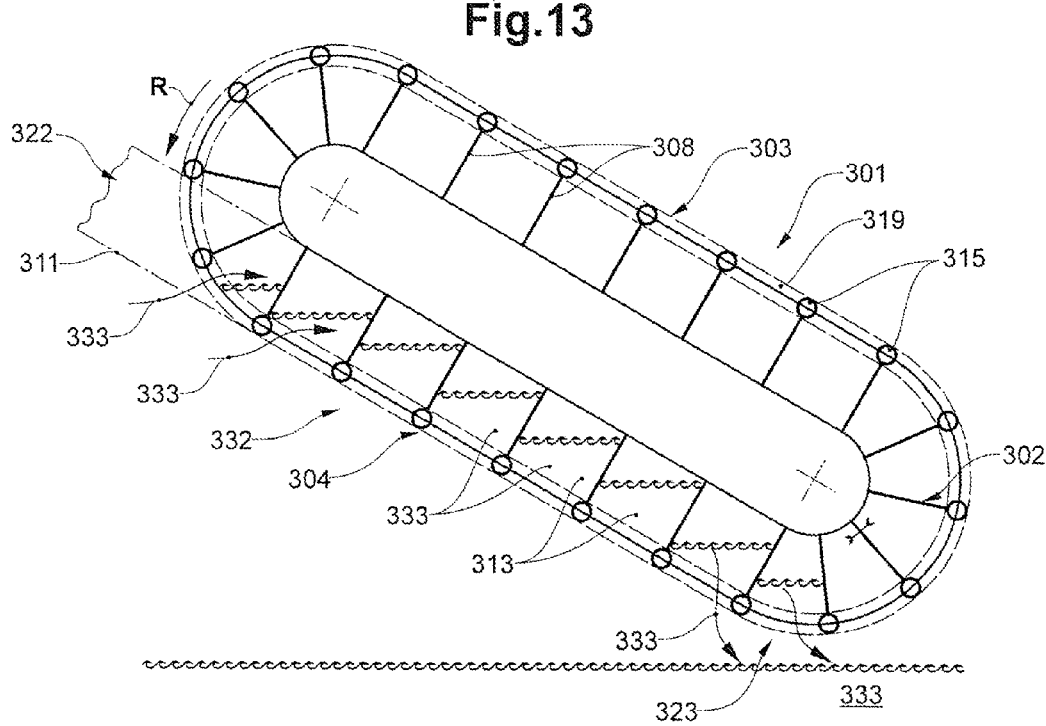
FIG. 13 is a sectional elevation view of a further embodiment of the installation according to the invention.
Figure 14:
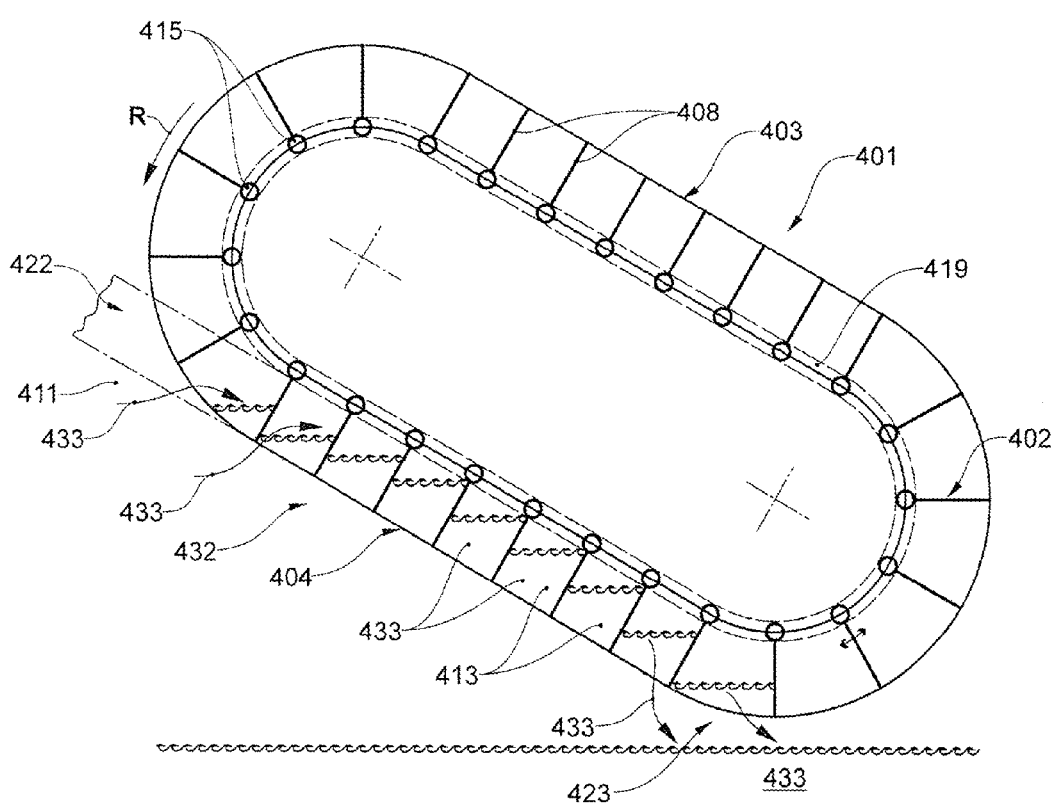
FIG. 14 is a sectional elevation view of a further embodiment of the installation according to the invention.
Figure 15:
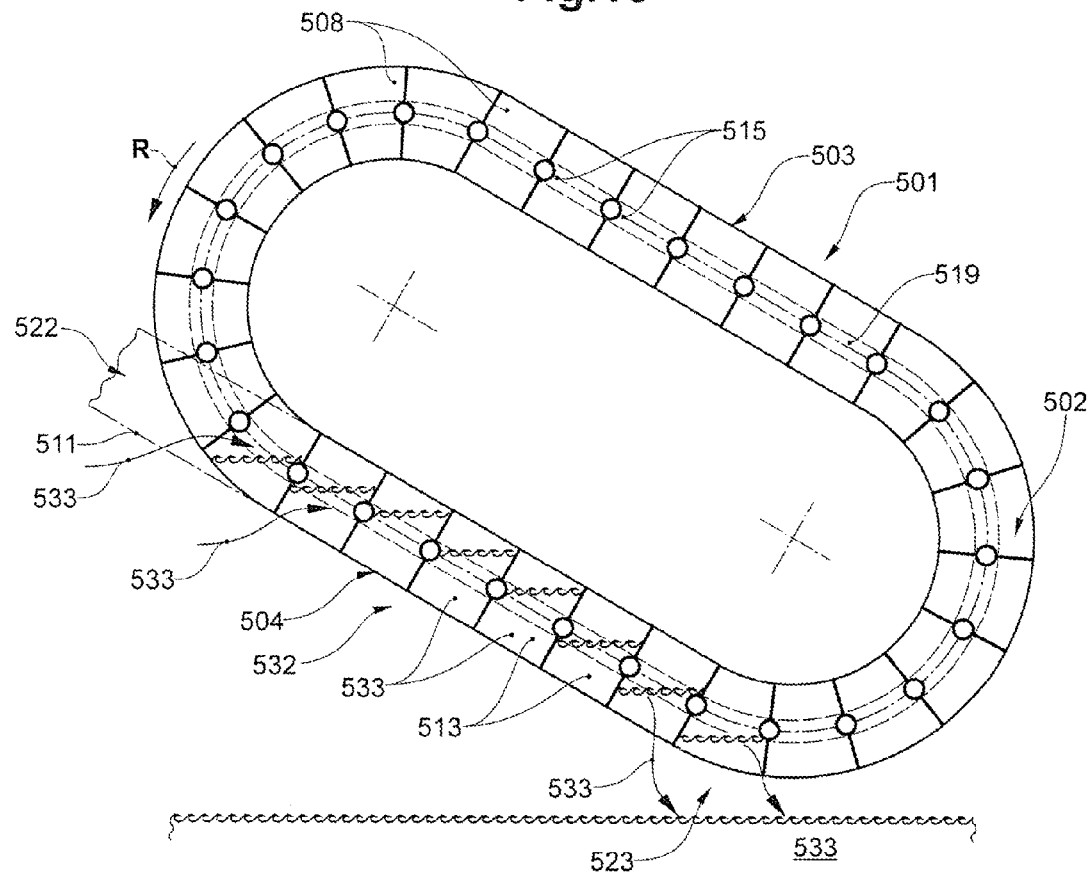
FIG. 15 is a sectional elevation view of a further embodiment of the installation according to the invention.

Three sub-variants of the first embodiment variant of the positive guiding according to the invention and which is described further above is represented schematically in FIGS. 13 to 15. The installation 301, 401, 501 comprises a drive arrangement 302, 402, 502 with a plurality of gravitational pressure transmission units 332, 432, 532 which are arranged one after the other and distanced to one another.

The gravitational pressure transmission units 332, 432, 532 each comprise an onflow element 308, 408, 508. Adjacent onflow elements 308, 408, 508 in each case in a load section 304, 404, 504 form water receiving compartments 313, 413, 513.

The gravitational pressure transmission units 332 seen in the revolving direction R further in each case comprise two guide elements 315, 415, 515 which are arranged laterally of the onflow element 308, 408, 508.

The installation 301, 401, 501 moreover comprises two guide rails 319, 419, 519 which are arranged parallel to one another in each case laterally of the water guidance channel or on the water guidance channel (not shown) and are distanced to one another. The guide rails 319, 419, 519 amongst others lead through a load section 304, 404, 504 and a return section 303, 403, 503.

The guide rails 319, 419, 519 from a closed positive guiding along the revolving path of the gravitational pressure transmission units 332, 432, 532. The gravitational pressure transmission units 332, 432, 532 are positively guided along the guide rails 319, 419, 519 via the guide elements 315, 415, 515.

Water 333, 433, 533 in a run-in region 322, 422, 522 which is located at a higher level now runs into the water receiving compartments 313, 413, 513 and moves the gravitational pressure transmission units 332, 432, 532 in the direction of an outlet region 323, 423, 523, in which the water is discharged again out of the water receiving compartments 313, 413, 513.

The water 333, 433, 533 in the outlet region 323, 423, 523 preferably flows in the vertical direction or essentially in the vertical direction downwards out of the water receiving compartments 313, 413, 513, so that the onflow elements 308, 408, 508 entrain as little as possible residual water in the direction of the return section 303, 403, 503.

The deflection element at the upper and lower deflection section amongst other things is designed by way of arched sections of the guide rails 319, 419, 519 which connect the load section to the return section of the guide rails.

The first sub-variant mentioned above is now described in FIG. 13. The guide elements 315 here with respect to the closed revolving path are arranged laterally on the radially outer-lying end section of the onflow element 308. The guide rails 319, in which the guide elements 315 are guided, are arranged laterally in the region of the end section of the water guidance channel 311 which is towards the base.

According to this arrangement, the water receiving compartments 313 in the deflection at the upper and lower deflection element are reduced in a wedge-like manner due to the radial alignment of the onflow elements 308 in the deflection arch.

The positive guiding according to the present first sub-variant in comparison to the second and in particular to the third sub-variant permits an extremely compact construction manner of the installation, without the receiving capacity of the water receiving compartments or the length of the load section being reduced on account of this.

The above mentioned third sub-variant is represented in FIG. 14. The guide elements 415 here with respect to the closed revolving path are arranged at the radially inwardly lying end section of the onflow element 408. The guide rails 419, in which the guide elements 415 are led, can be arranged laterally in the region of the opening-side end section of the water guidance channel 411 or over the water guidance channel 411 (see also FIGS. 11 and 12).

A cross section through the water guidance channel of one possible design solution of the positive guidance according to this third sub-variant is represented in FIG. 11, as already mentioned The second sub-variant mentioned above is represented in FIG. 15. The guide elements 515 with respect to the closed revolving path are arranged laterally between the radially outwardly and inwardly lying end sections of the onflow element 508. The guide rails 519 are arranged in the channel side walls, laterally in the region between the end section towards the base and the opening-side end section, of the water guidance channel 511.

Figure 16:
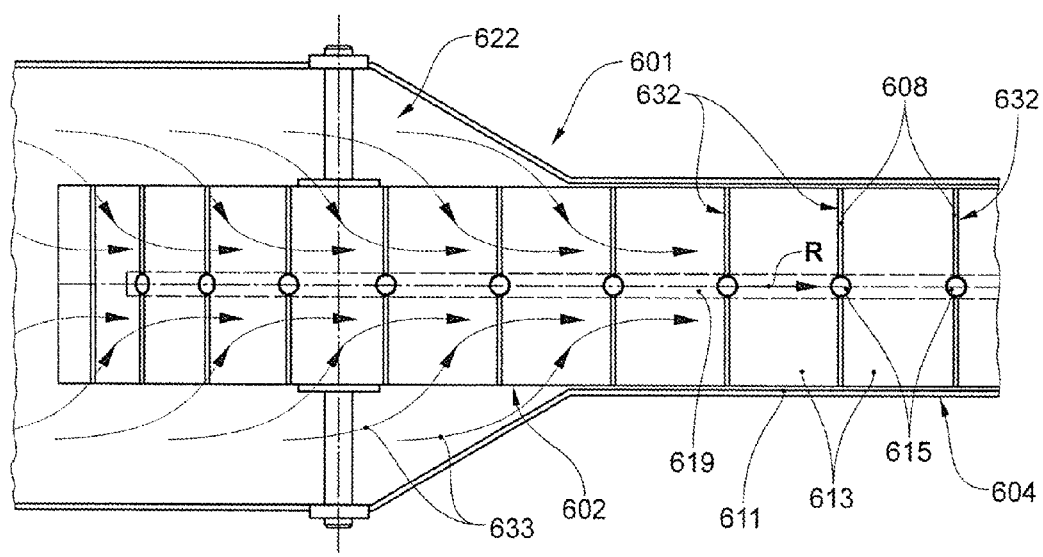
FIG. 16 is a plan view of the run-in region of a further embodiment of the installation according to the invention.

FIG. 16 shows the third sub-variant of a positive guidance (see also FIGS. 12 and 14) which is described above. The installation 601 comprises a guide rail 619 which is arranged centrally above the water guidance channel 611. The gravitational pressure transmission units 632 in each case comprise an onflow element 608 as well as a guide element 615 which is arranged above the onflow element 608 centrally between its end sections which are lateral seen in the revolving direction, said guide element being guided in the guide rail 619 in the region of the load section 604.

The run-in region 622 is designed such that the water 633 amongst other things flows laterally obliquely into the forming water receiving compartments 613 and flows onto the onflow element 608 immersing into the water guidance channel 611. A quicker and more efficient filling of the water receiving compartments 613 is achieved by way of this A cross section through the water guidance channel of one possible design solution of the positive guidance according to this second embodiment variant is represented in FIG. 12, as already mentioned.

Figure 17:
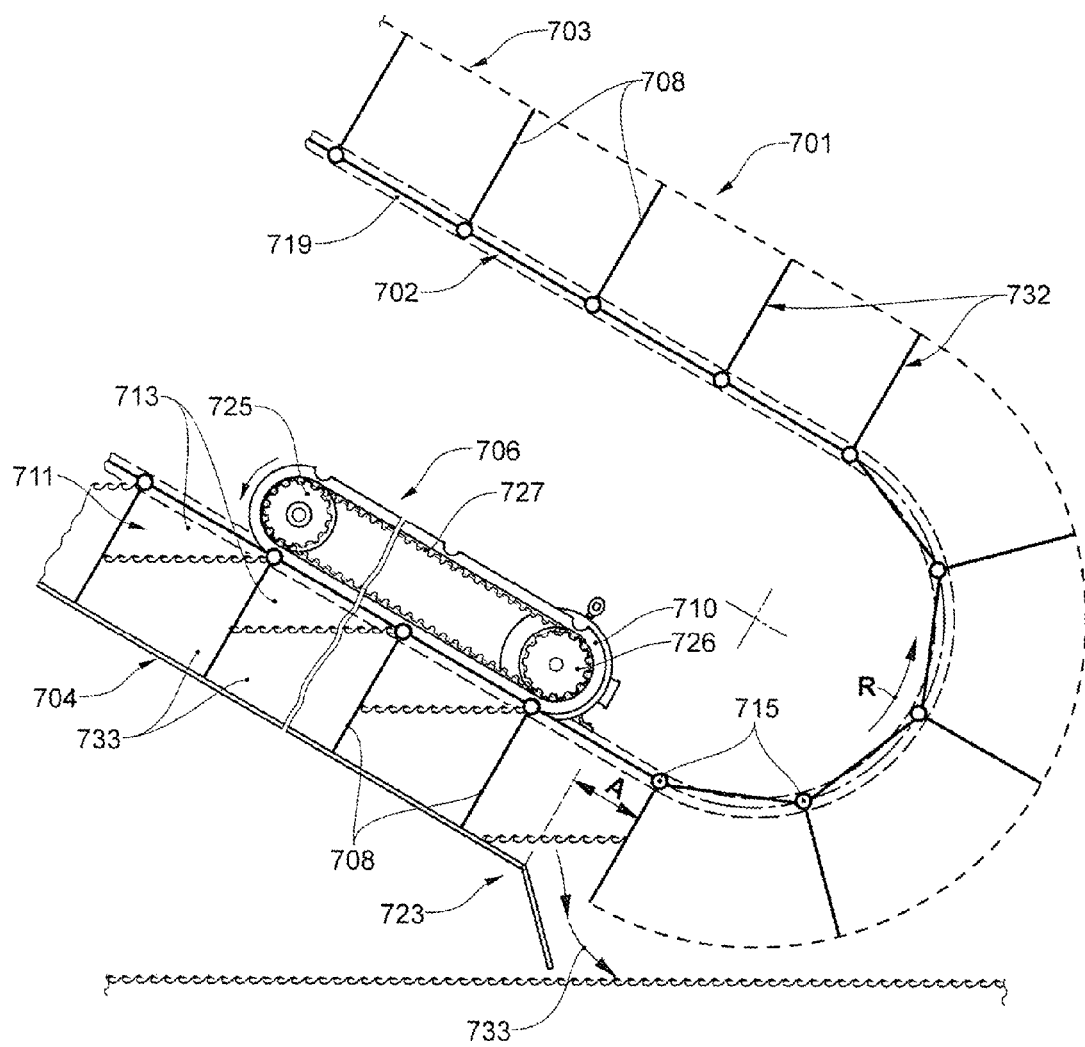
FIG. 17 is a sectional view of the outlet or discharge region according to a further development of the installation according to FIG. 14.

FIG. 17 shows a part-view of the outlet region 723 of a further embodiment of an installation 701 according to the invention. The installation 701 comprises a drive arrangement with a multitude of gravitational pressure transmission units 732 which are positively guided along a closed revolving path 732. The positive guiding of the drive arrangement 702 is effected via guide elements 715 led in a guide rail 719, and corresponds to the positive guidance according to the third sub-variant according to FIG. 14. The citations with regard to FIG. 14 are referred to with regard to the description of the positive guidance.

The gravitational pressure transmission units 732 in each case comprise an onflow element 708 which extends transversely over the width of the water guidance channel 711. Two adjacent onflow elements 708 in each case together with the water guidance channel 711 form a water receiving compartment 713.

The installation 701 comprises a load section 704 which runs in an inclined manner and is with outlet region 723 arranged at the lower end of this load section. A shaft-like outlet or discharge is provided in the outlet region 723, via which the water 733 held in the water receiving compartments 713 is let out or discharged essentially vertically downwards.

The gravitational pressure transmission units 732 subsequently to the discharge of the water 733, are led around in an arch into a return section 703 which leads the gravitational pressure transmission units 732 back again into the run-in region (not shown).

The deflection element in the lower deflection region is formed by an arched section of the guide rail 719 which connects the load section to the return section of the guide rail 719.

The drive arrangement 702 in the lower region of the load section 704 is engaged with a tow drive. The tow drive 706 comprises a flexible drive element 727 which is led around two deflection elements 725, 726 distanced to one another, and this drive element is engaged positively and/or non-positively (frictional connection) with the drive arrangement 702 via an engagement section.

The gravitational pressure transmission units 732 of the drive arrangement 702 which are led past the tow drive 706 to the lower deflection element now drive the drive element 727 of the tow drive 706. A generator 710 draws torque at one of the deflection elements 726 of the tow drive 706, for producing electricity.

Figure 18:
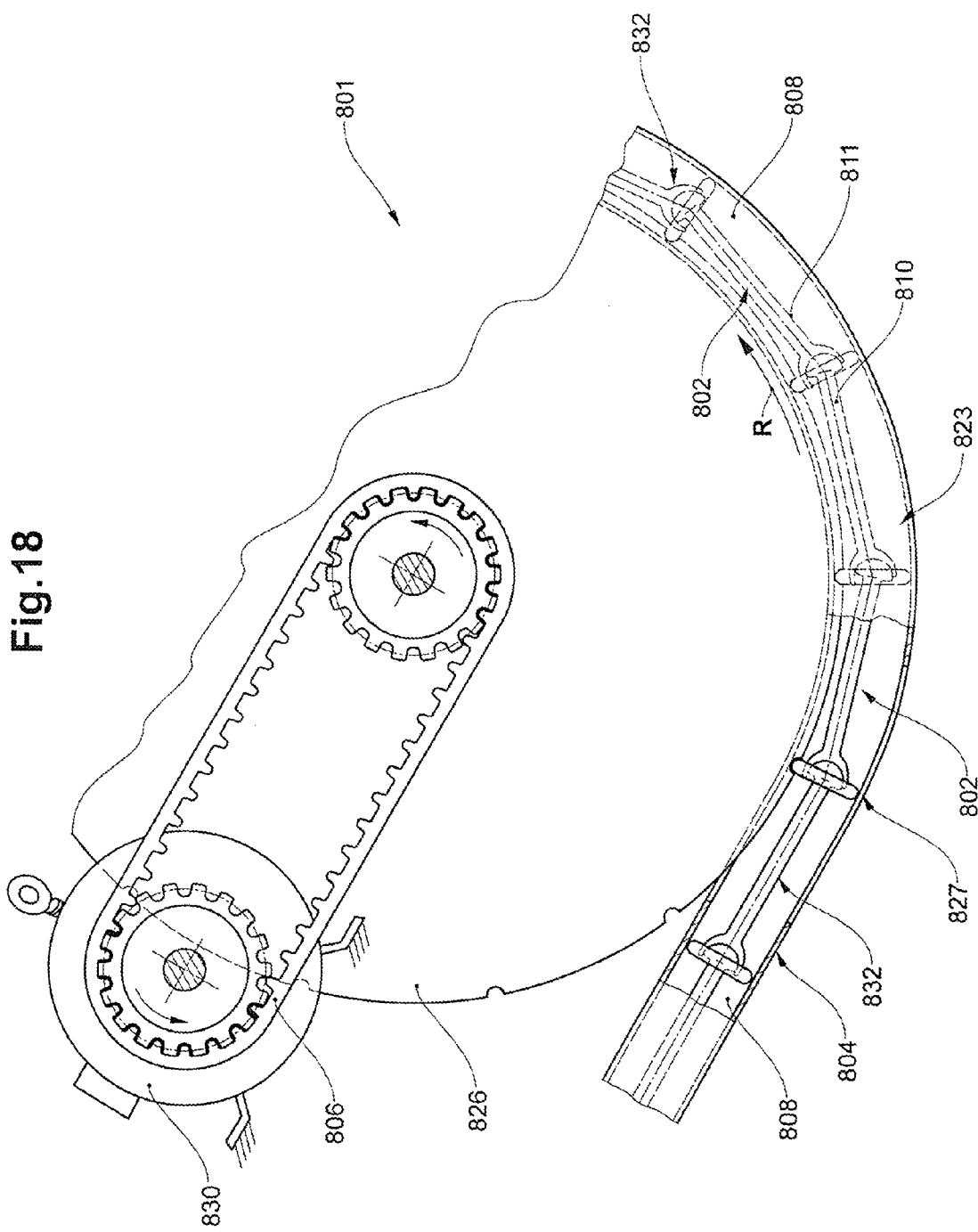
FIG. 18 is a sectional view of the discharge region of a further embodiment of an installation according to the invention.

FIG. 18 shows a part-view of the outlet region 823 of a further embodiment of an installation 801 according to the invention. The installation 801 comprises a drive arrangement 802 with a multitude of gravitational pressure transmission units 32 positively guided along a closed revolving path.

The gravitational pressure transmission units 832 each comprise an onflow element 808 extending transversely over the width of the water guidance channel 827. These in the load section 804 divide the water guidance channel 827 into water receiving compartments. The water guidance channel 827 is designed closed in a tubular manner in the load section 804. The tubular water guidance channel 827 is open to the bottom in the outlet region 823, so that the water can flow away out of the water receiving compartments.

The gravitational pressure transmission units 832 are not connected to one another in a fixed manner but are designed as push bodies. The gravitational pressure transmission units 832 for this comprise force transmission elements 810, 811 for transmitting push forces from a gravitational pressure transmission unit 382 which runs in front in the revolving direction, to a subsequent gravitational pressure transmission unit 832.

The force transmission elements 810, 811 comprise push surfaces which cooperate with one another and via which the push forces are transferred further between the gravitational pressure transmission units 832. In this manner, the drive arrangement can be moved purely via push forces similarly to a drive chain, in the revolving direction around the deflection elements, without however the gravitational pressure transmission units 832 being fixedly connected to one another.

A rotation body 826 is arranged in the lower deflection region. The rotation body 826 at its periphery comprises recesses, into which elements such as e.g. the onflow elements 808 of the gravitational pressure transmission units 832 engage. The rotation body 826 is driven via this positive engagement by gravitational pressure transmission units 832. The rotation body 826 forms part of the lower deflection element. The tubular water guidance channel, which at the same time is a guide rail for the drive arrangement 802, as a further part of the deflection element is led in an arched manner about the rotation body 826 and connects the load section to the return section (not shown) of the water guidance channel or of the guide rail. The tubular guide rail in the arched deflection section is open towards the rotation body 826, so that the elements of the gravitational pressure transmission units 832 can engage into the recesses on the rotation body 826.

The rotation body 826 is connected via a drive means 806, such as belt or gear, to a generator 830. This takes power from the drive arrangement 802 for producing electricity.

The invention claimed is:

1. An installation for generating electrical energy from hydropower, comprising a drive arrangement that revolves around two deflection units distanced to one another, wherein the drive arrangement can be driven by hydropower in a revolving direction, with a load section running along a descent, wherein the drive arrangement comprises a plurality of gravitational pressure transmission units that are arranged one after the other in the revolving direction, and are distanced to one another, the gravitational pressure transmission units in each case comprise an onflow element with a blade-like wall element, further comprising a generator for generating electrical energy from the revolving drive arrangement, wherein:

the installation comprises a water guidance channel that runs along the descent, the onflow elements in the region of the load section run transversely to the water guidance channel and engage into this, such that in each case two adjacent onflow elements together with the channel walls form a compartment for receiving water, which is co-moved along the water guidance channel, the gravitational pressure transmission units comprise guide elements, and along the load section, the installation comprises guide units in which guide elements of the gravitational pressure transmission units are displaceably arranged such that the gravitational pressure transmission units at least in the region of the load section are guidable between the two deflection units.

2. The installation according to claim 1, wherein the guide units comprise at least one guide rail.

3. The installation according to claim 2, wherein the gravitational pressure transmission units in each case comprise two guide elements that, considered in the revolving direction, are arranged laterally of the onflow element, and the installation in the load section comprises two guide rails that are each arranged laterally on the water guidance channel, wherein the guide elements are led along the load section in the guide rails, and
  a. the guide elements are arranged laterally on the outwardly lying end section of the onflow element, and the guide rails are arranged laterally in the end section of the water guidance channel that is towards the base; or
  b. the guide elements are arranged laterally between the outwardly and inwardly lying end section of the onflow element, and the guide rails are arranged laterally between the end section which is towards the base, and the opening-side end section, of the water guidance channel; or
  c. the guide elements are arranged laterally on the inwardly lying end section of the onflow element, and the guide rails are arranged laterally in the opening-side end section of the water guidance channel.

4. The installation according to claim 2, wherein the installation comprises a guide rail arranged above the water guidance channel, and the gravitational pressure transmission units in each case comprise at least one guide element that is arranged above the onflow element and which in the region of the load section is led in the guide rails.

5. The installation according to claim 2, wherein the guide rail is a profile longitudinal body with a guide channel for the guided receiving of the guide elements.

6. The installation according to claim 1, wherein the gravitational pressure transmission units are designed of several parts.

7. The installation according to claim 1, wherein the onflow elements in each case comprise at least one stiffening element, in particular a stiffening rib or a stiffening transverse wall.

8. The installation according to claim 1, wherein the guide elements are designed as guide rollers or sliding elements.

9. The installation according to claim 1, wherein the gravitational pressure transmission units of the drive arrangement are not connected to one another and comprise force transmission elements for the transmission of push forces.

10. The installation according to claim 1, wherein the drive arrangement is a connected drive structure, with a plurality of drive links, and the gravitational pressure transmission units correspond to drive links and comprise connection units for the mutual articulated connection of the drive links into a connected drive structure.

11. The installation according to claim 10, wherein the guide rollers are arranged on the connection units and are connected to these in each case via a roller pivot, and the roller pivot also forms a connection element between the drive links.

12. The installation according to claim 1, wherein the deflection units each comprise a rotation body, along which the gravitational pressure transmission units, in particular the connection elements of the drive links, run in an arched track via a positive engagement.

13. The installation according to claim 1, wherein a lower deflection unit in the lower deflection region and which preferably is not coupled to an electricity production generator, is designed as a guide unit that runs in an arched manner, wherein the drive arrangement is led along the guide unit in an arched manner, and wherein preferably a transition arch is formed on the lower deflection unit in a manner connecting to the load section and wherein said transition arch has a continuously reducing radius of curvature.

14. The installation according to claim 1, wherein the load section and the water guidance channel run along an oblique plane.

15. The installation according to claim 1, wherein the installation comprises a relief channel, via which water can be branched off in front of the run-in region and can be led past the water guidance channel.

16. A method for the operation of the installation according to claim 1, wherein in that water is admitted into the inclined water guidance channel at a run-in region situated at a higher level, and the onflow elements of the gravitational pressure transmission units, in the run-in region, are brought into the water guidance channel, wherein the onflow elements and the channel walls of the water guidance channel form water receiving compartments.

17. The method for operation of the installation according to claim 16, wherein water is introduced into the water receiving compartments in the water guidance channel, and the water is led downwards to a outlet region situated at a lower level and is discharged there, wherein the drive arrangement is driven by the potential drop of the water via the onflow elements, and wherein electrical or mechanical power is taken from the driven drive arrangement.

\* \* \* \* \*